Figure 1:
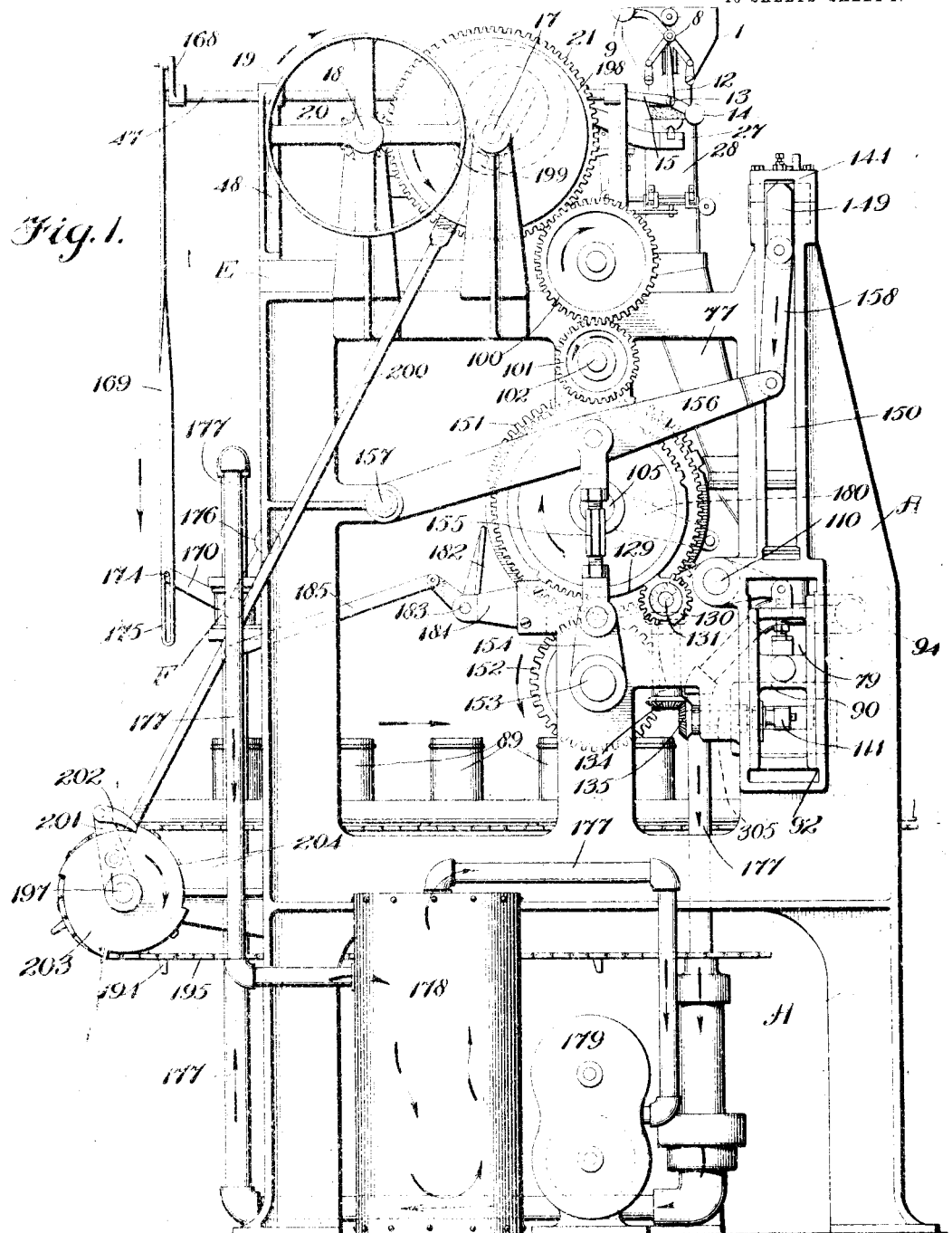

H. G. DEWEY.
AUTOMATIC FILLING MACHINE.
APPLICATION FILED OCT. 17, 1911.
1,075,903.
Patented Oct. 14, 1913.
18 SHEETS—SHEET 2.
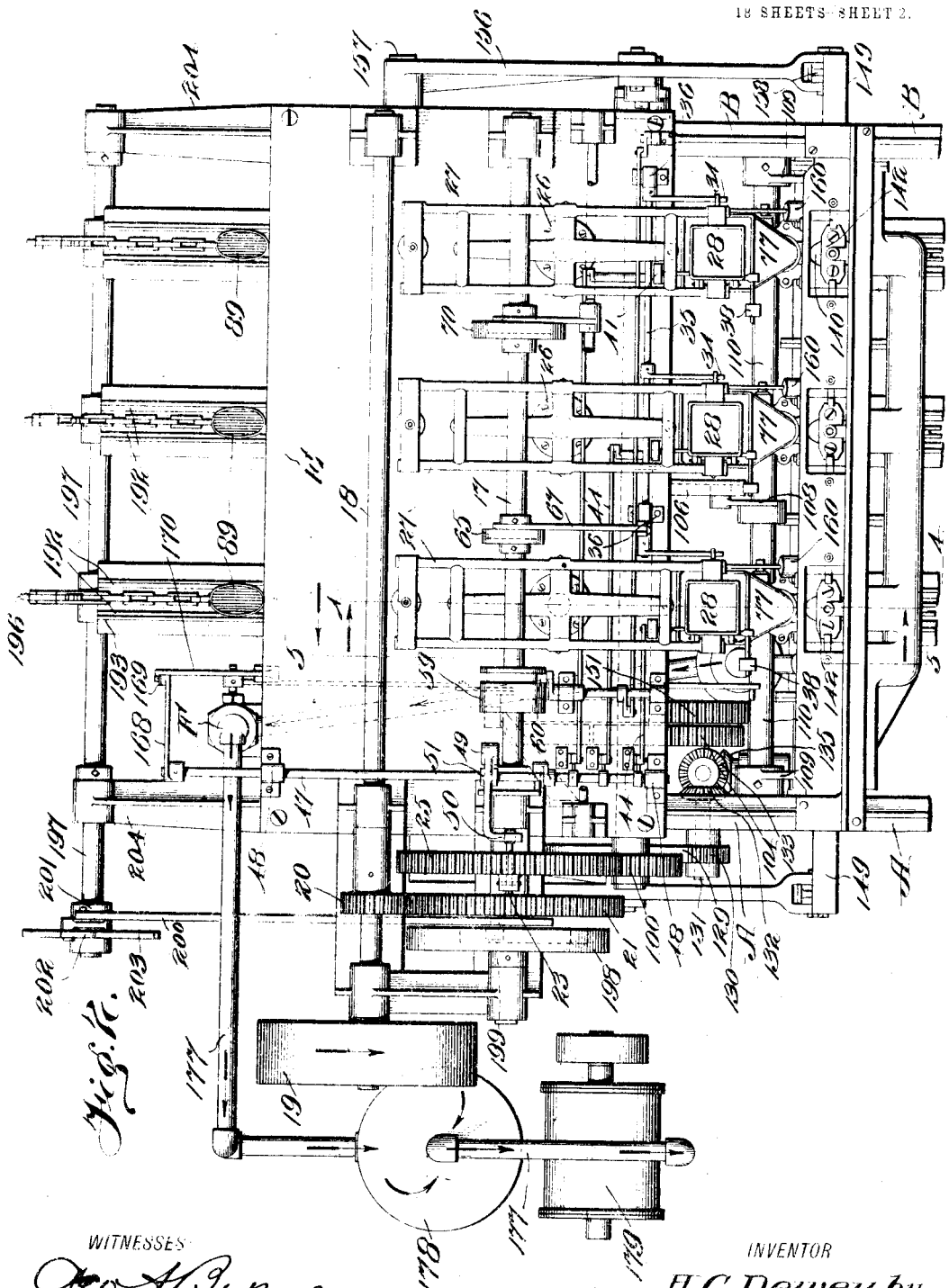
WITNESSES
INVENTOR
H. G. Dewey, by
ATTORNEYS H. G. DEWEY.
AUTOMATIC FILLING MACHINE.
APPLICATION FILED OCT. 17, 1911.
1,075,903.
Patented Oct. 14, 1913
18 SHEETS—SHEET 3.
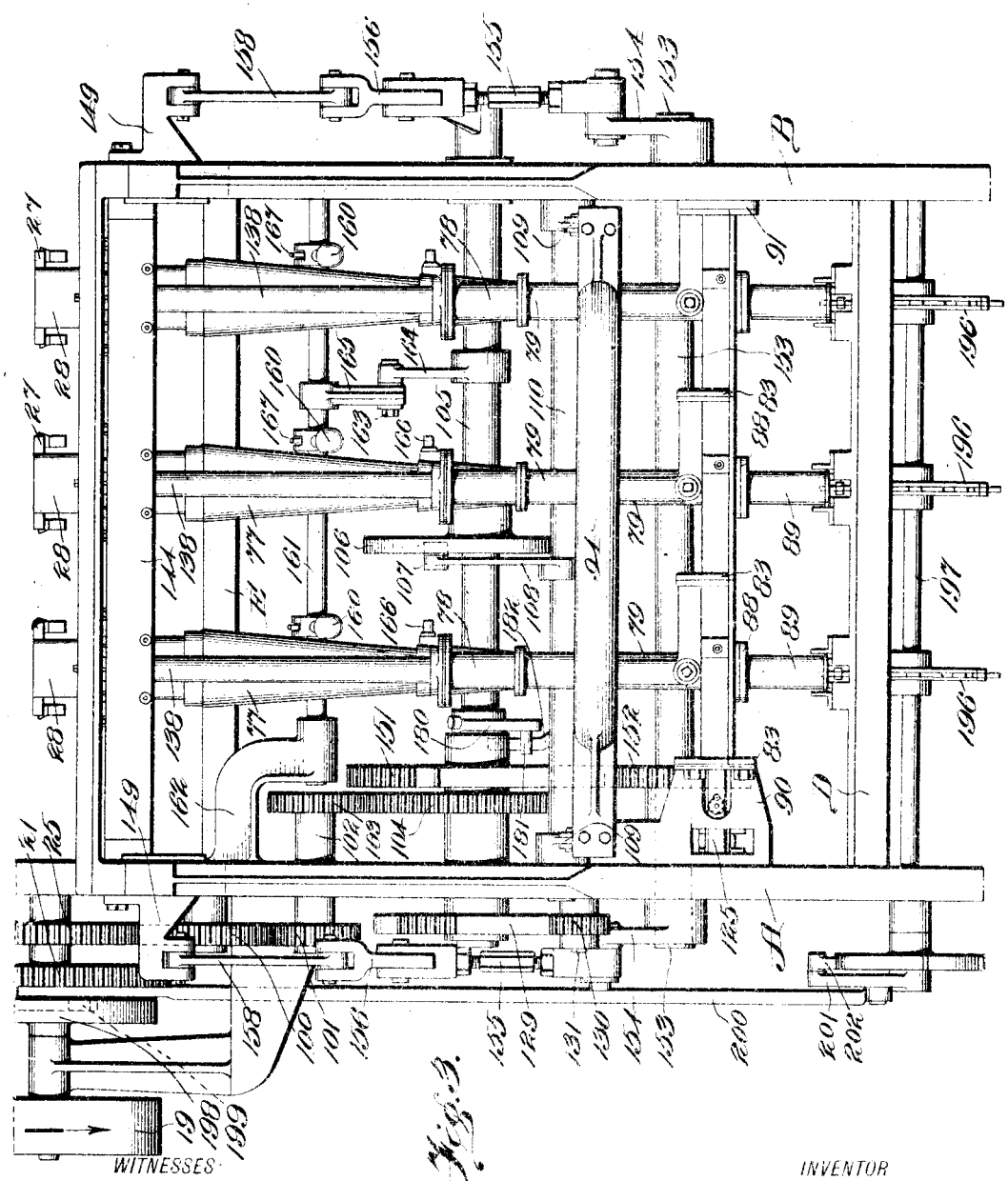

H. G. DEWEY.
AUTOMATIC FILLING MACHINE.
APPLICATION FILED OCT. 17, 1911.
1,075,903.
Patented Oct. 14, 1913.
18 SHEETS—SHEET 4.
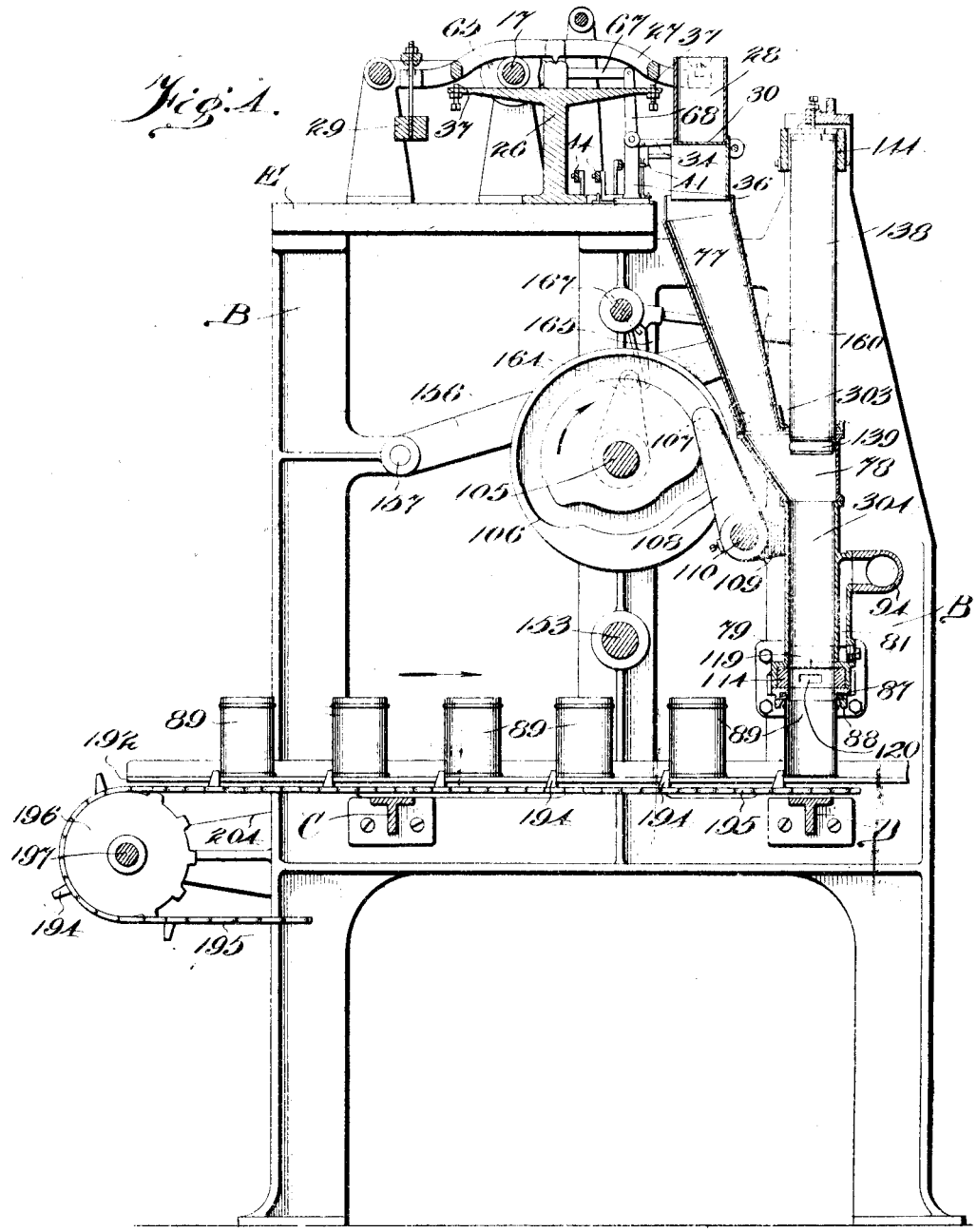
Fig. A.
WITNESSES:
INVENTOR
H. G. Dewey by
ATTORNEYS

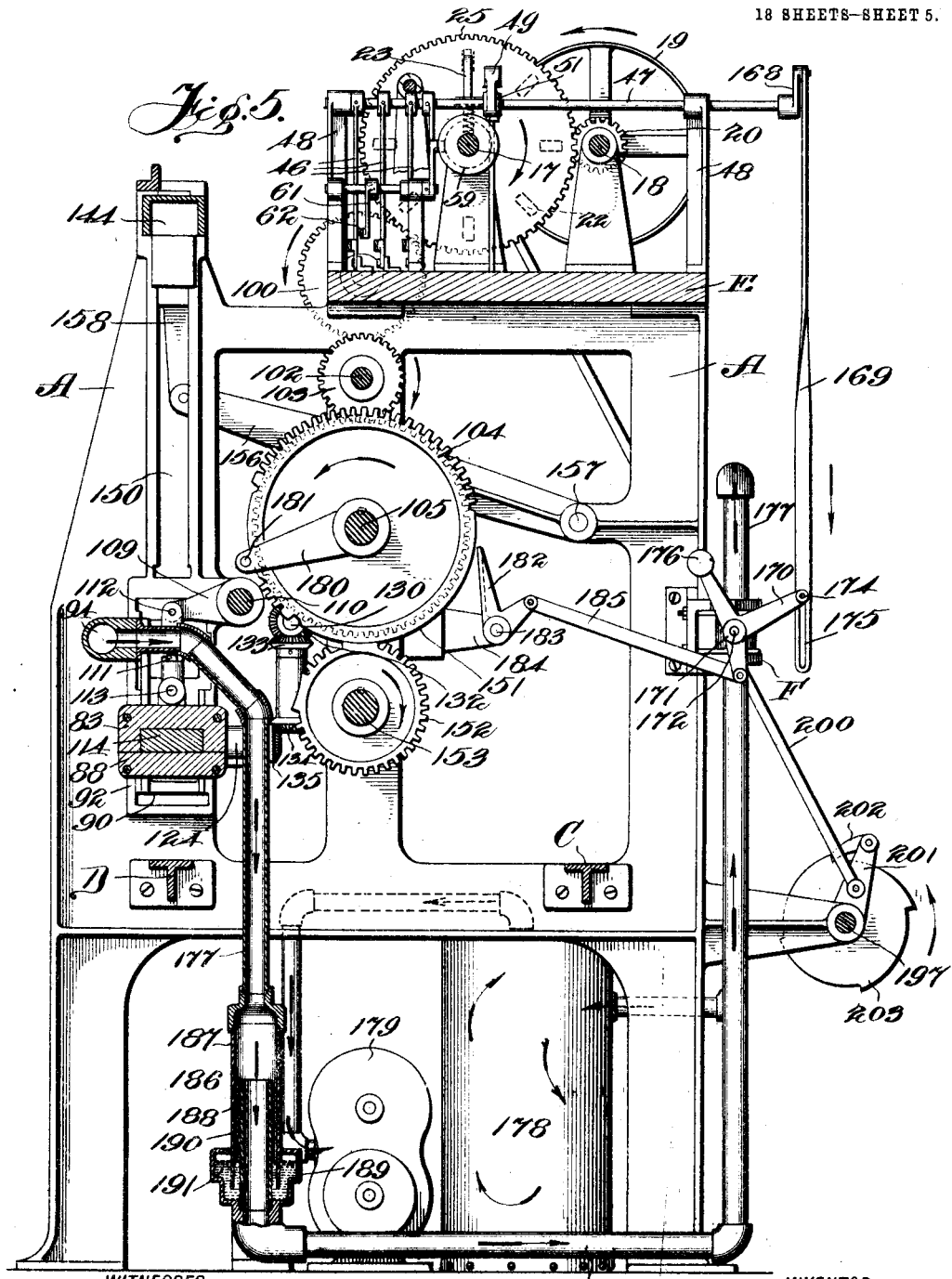

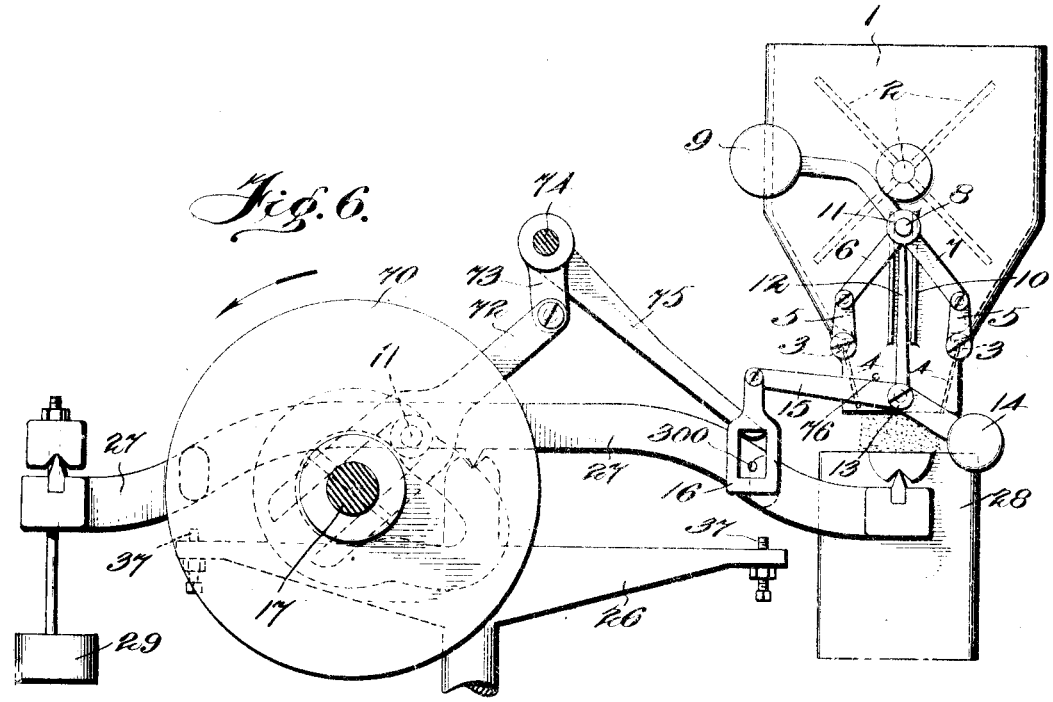
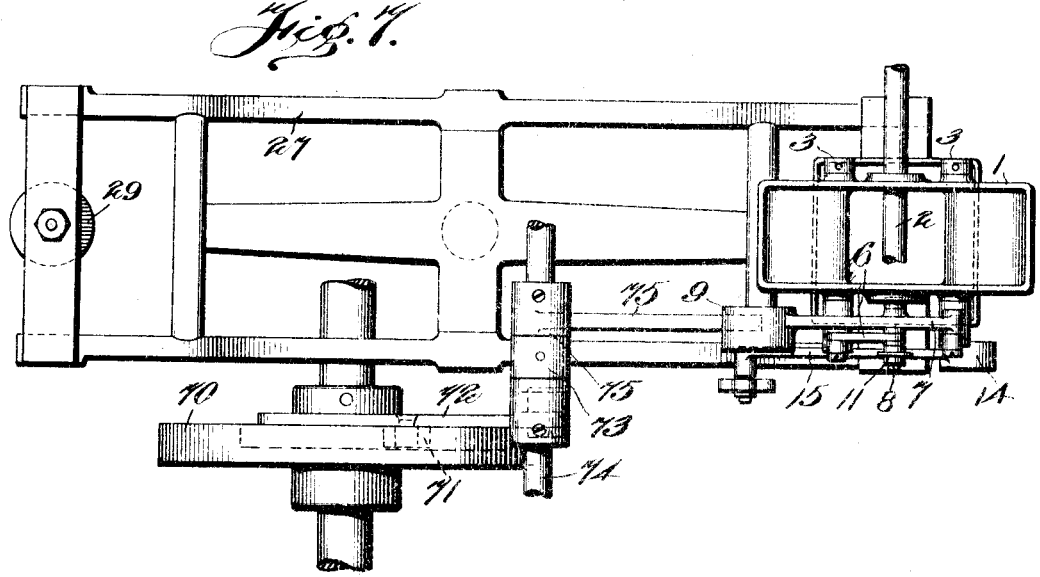

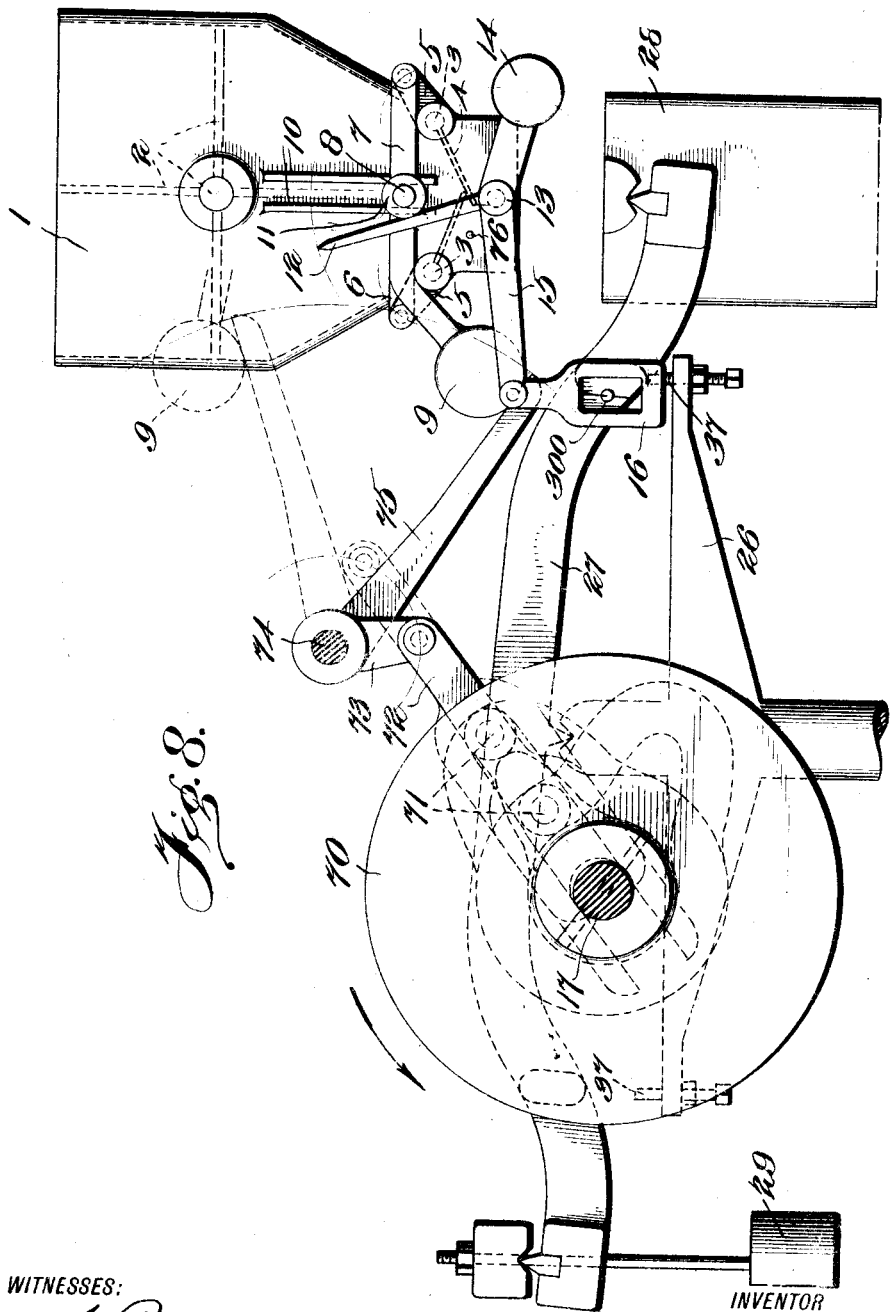

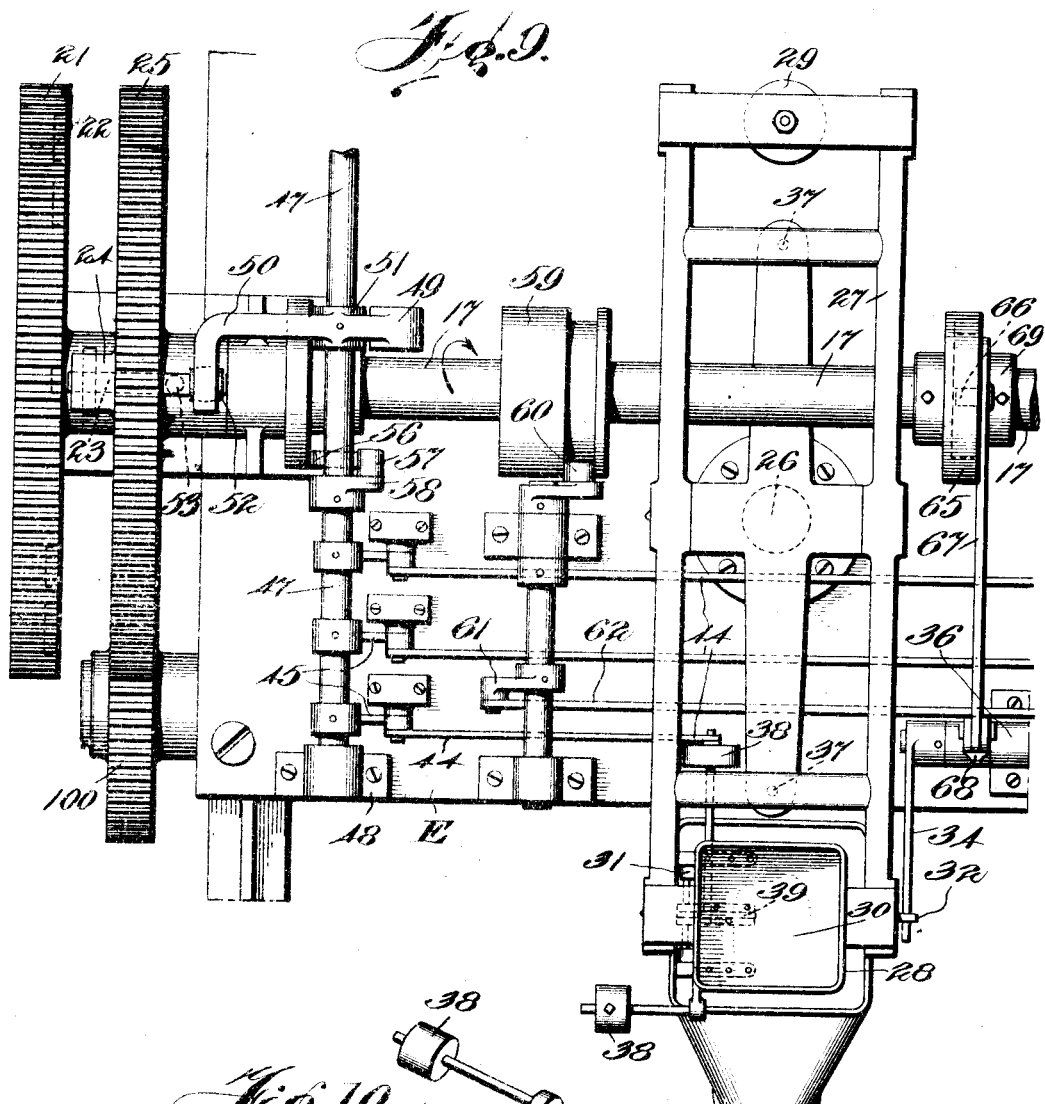

H. G. DEWEY.
AUTOMATIC FILLING MACHINE.
APPLICATION FILED OCT. 27, 1911.
1,075,903.
Patented Oct. 14, 1913.
18 SHEETS—SHEET 9.
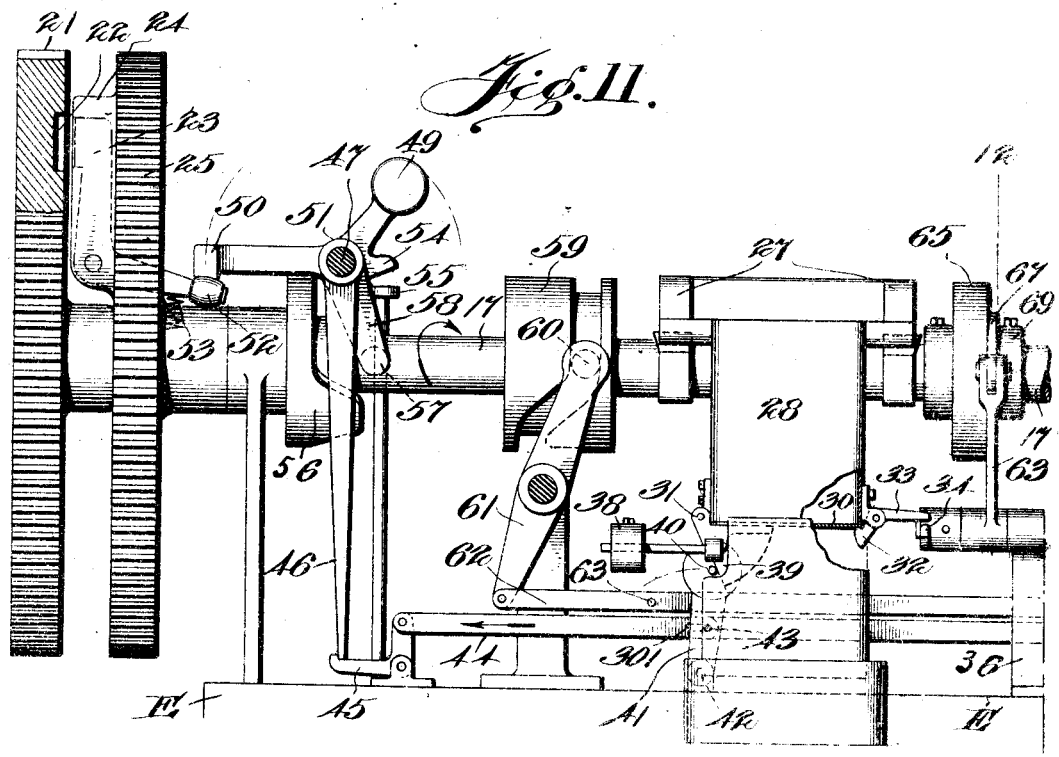
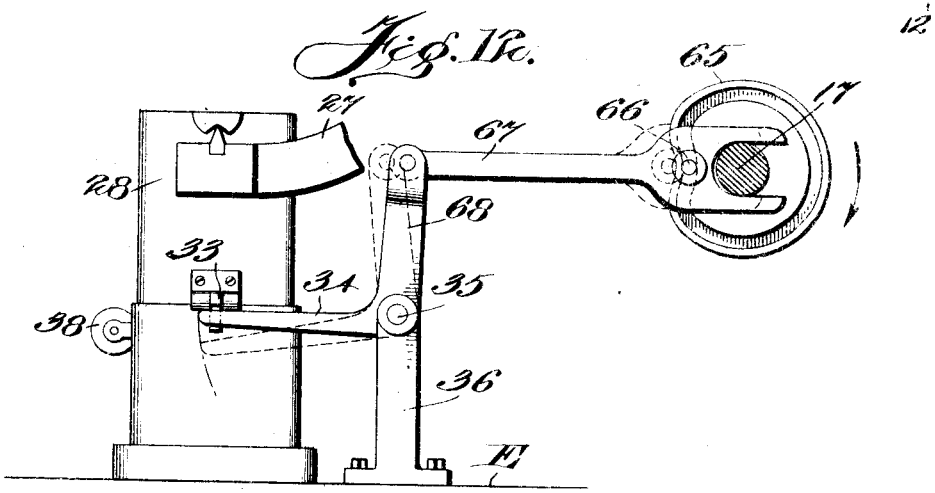
WITNESSES:
INVENTOR
H. G. Dewey, by
ATTORNEYS

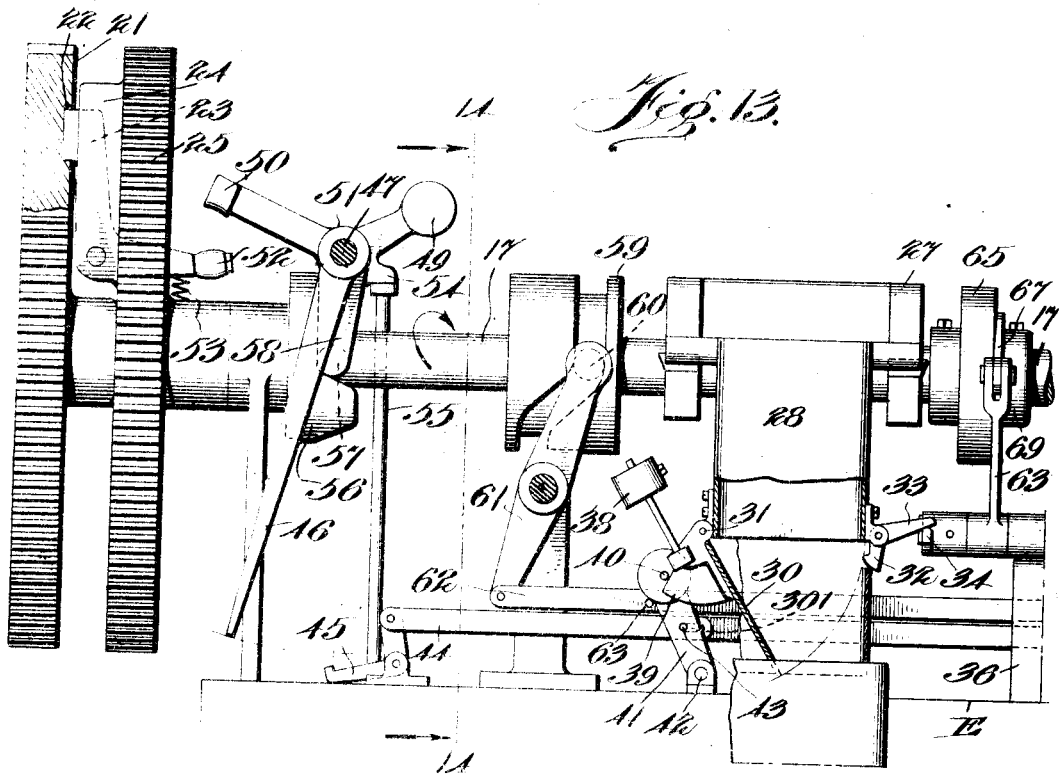

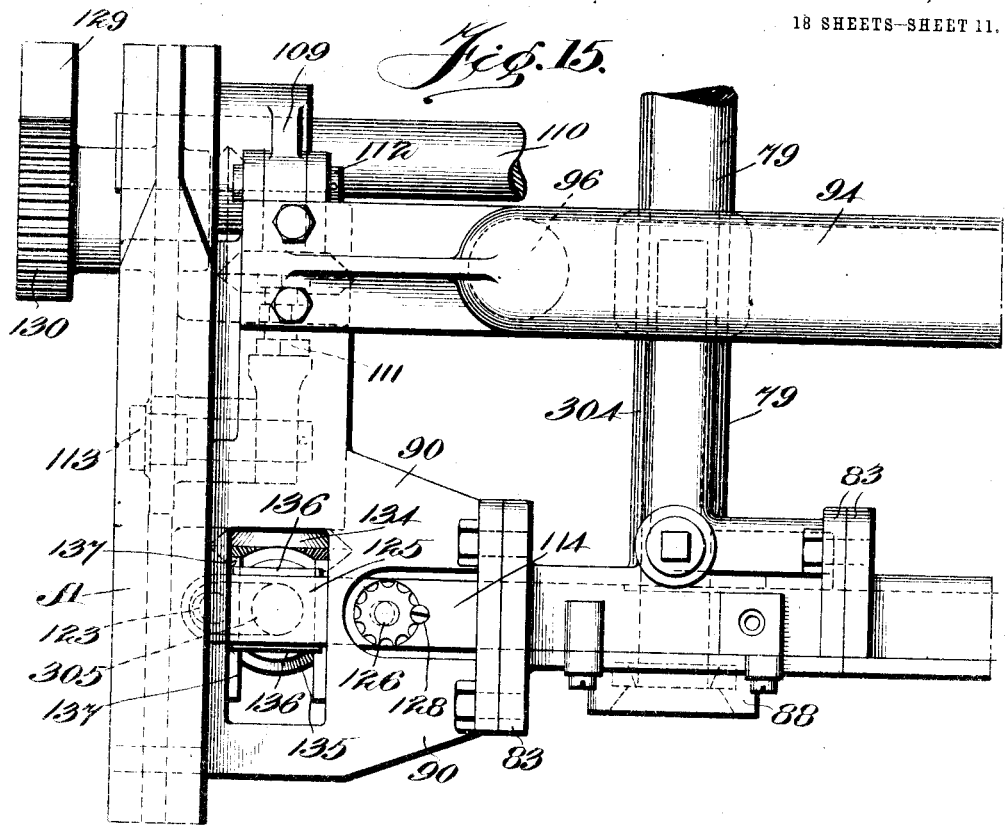

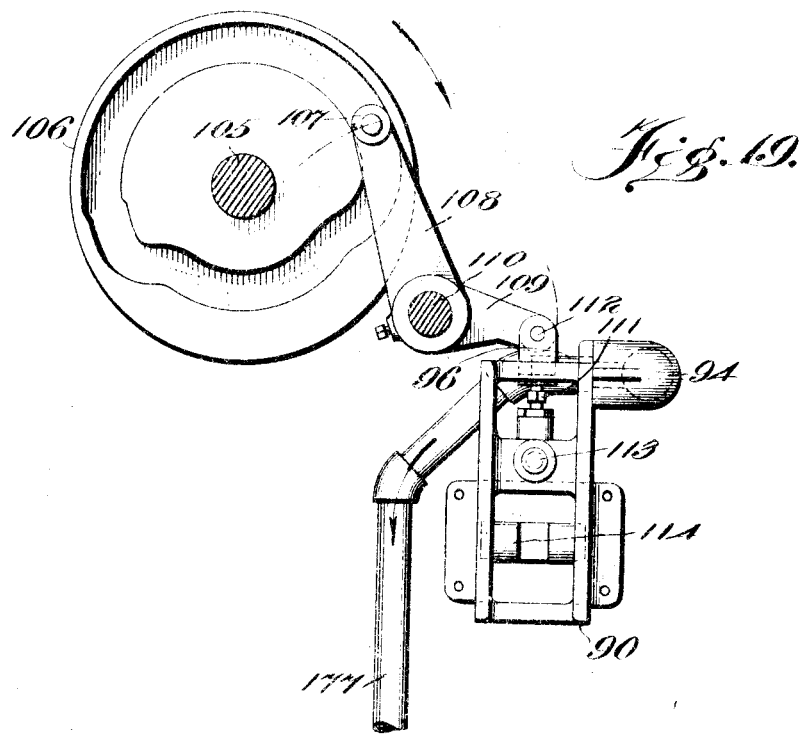

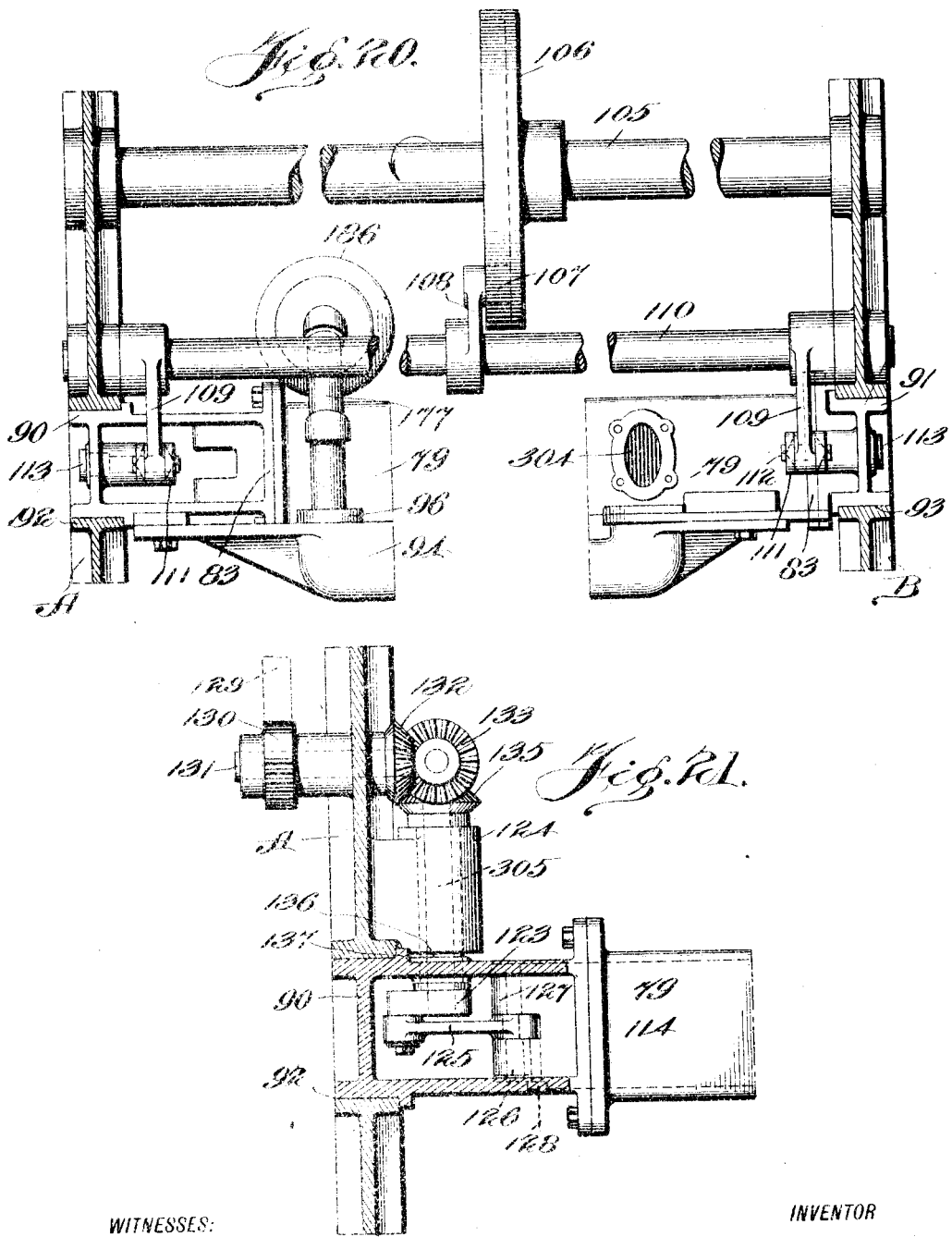

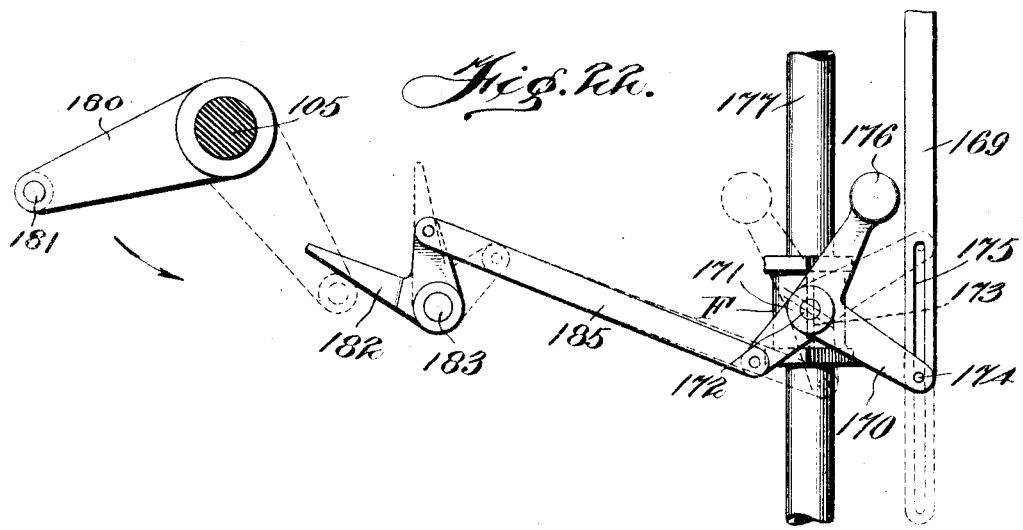
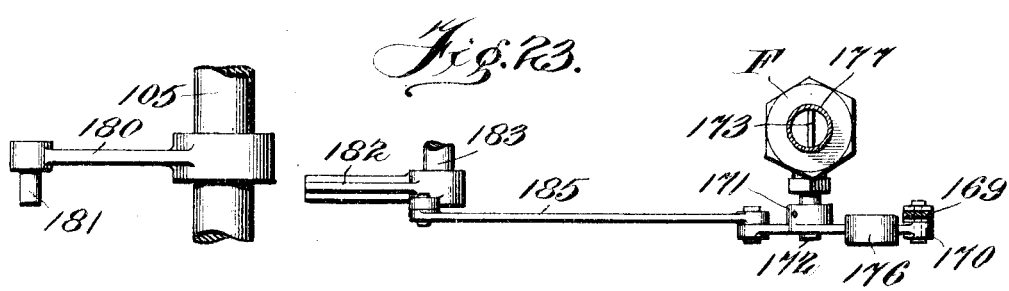
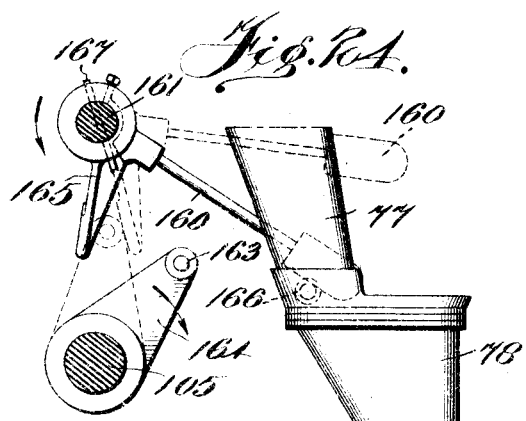

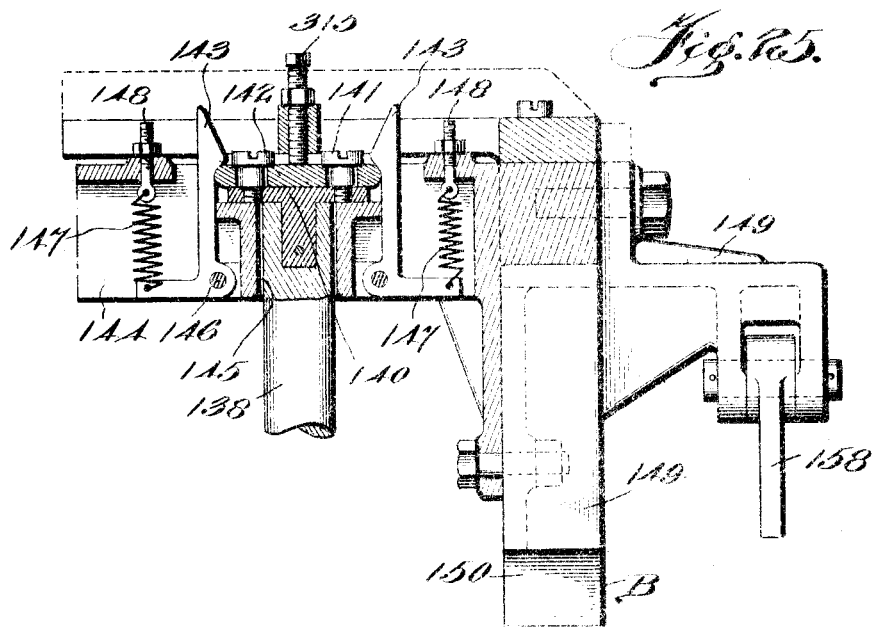
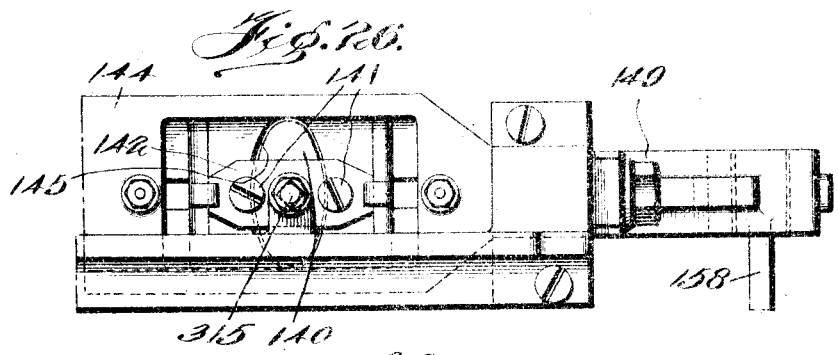
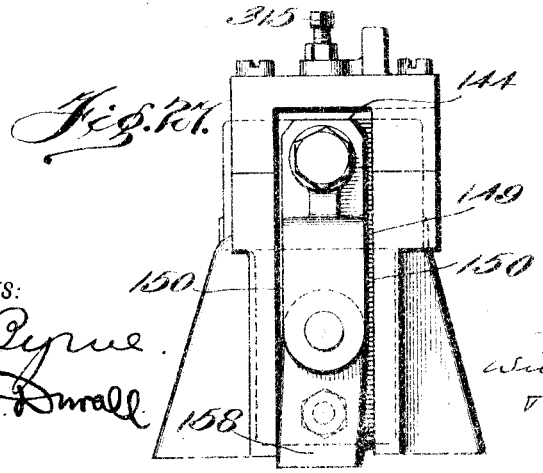

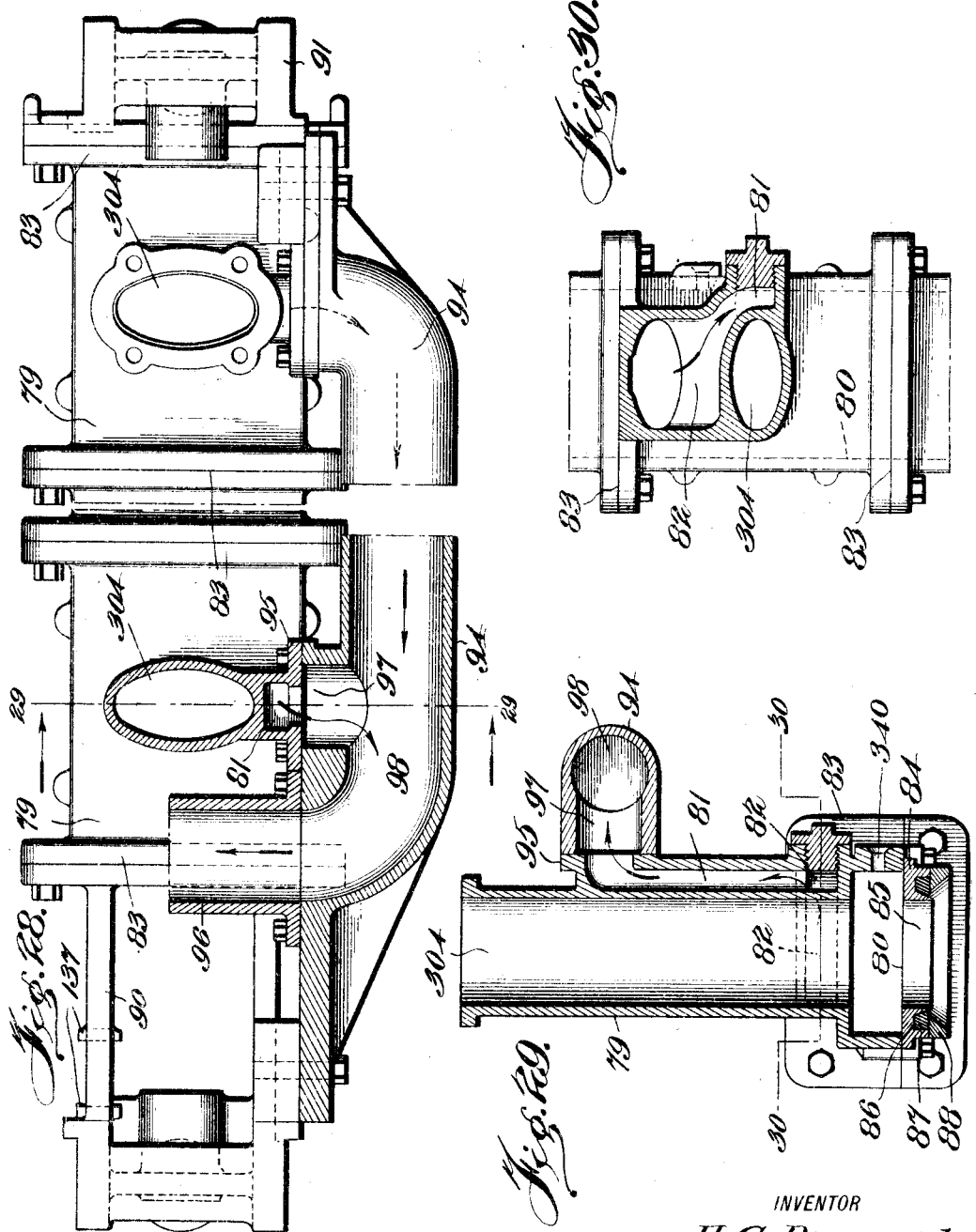

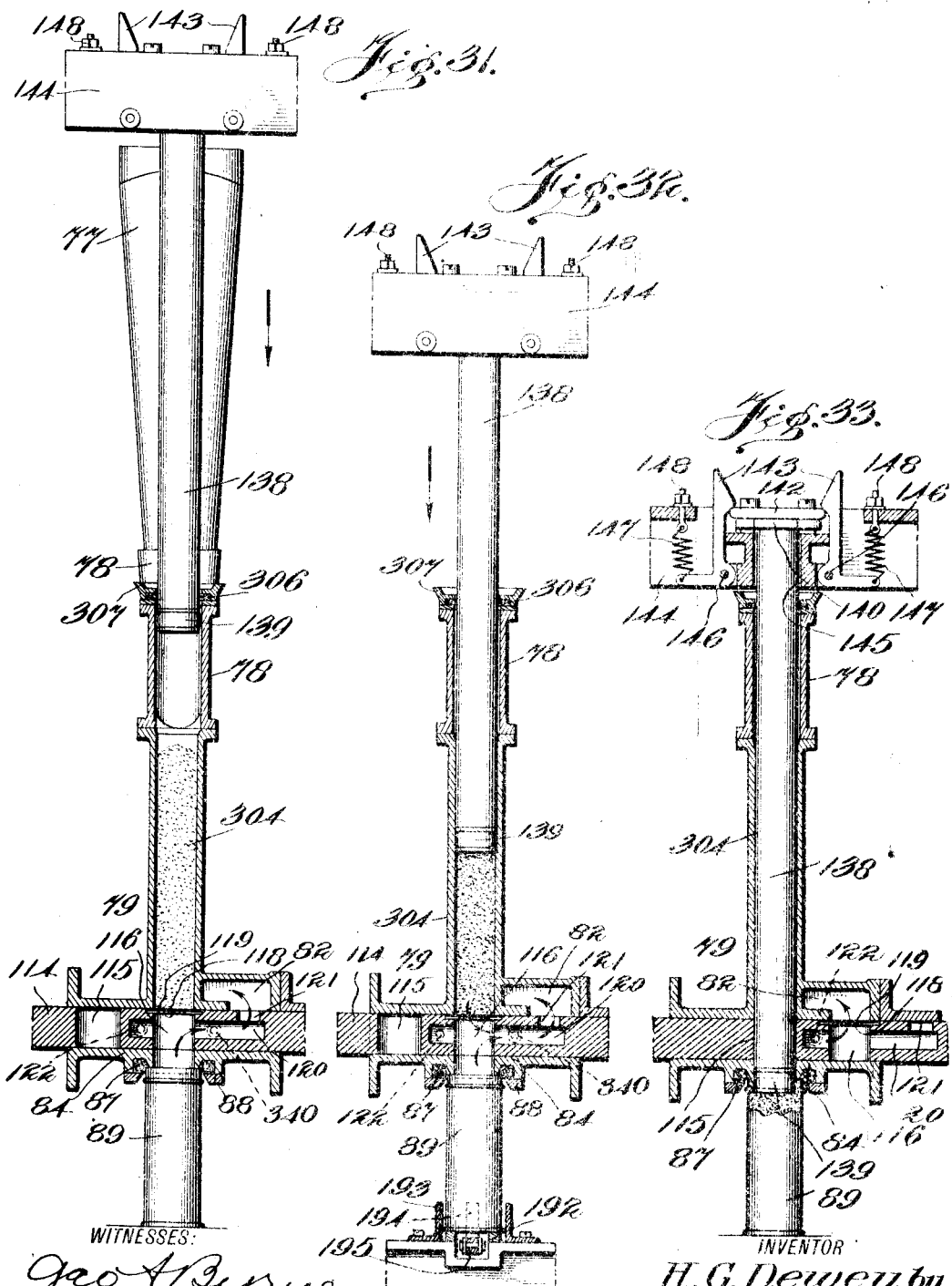

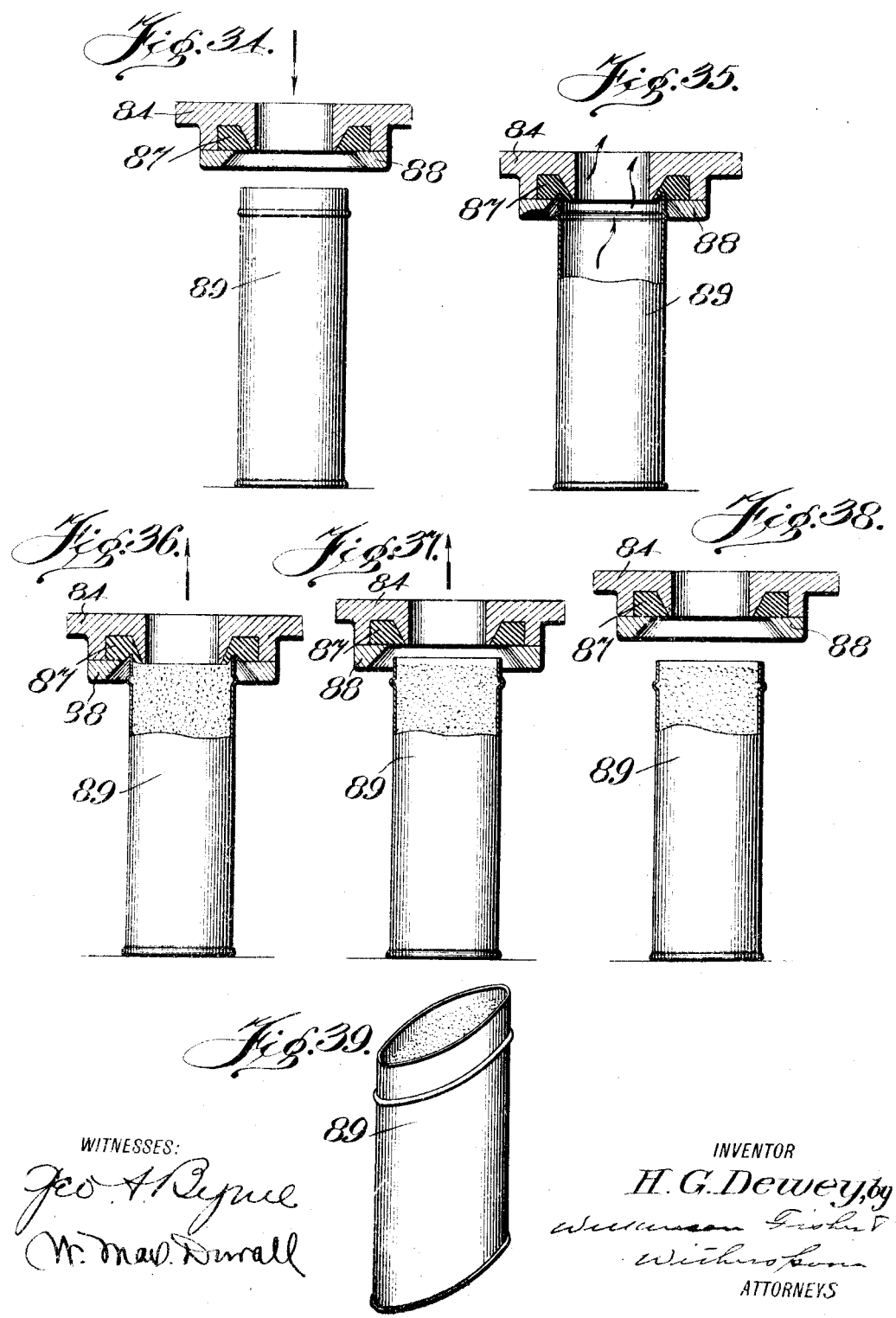

UNITED STATES PATENT OFFICE.

HAYWOOD GUION DEWEY, OF EAST ORANGE, NEW JERSEY, ASSIGNOR TO SINGLE SERVICE PACKAGE CORPORATION OF AMERICA, OF NEW YORK, N. Y., A CORPORATION OF NEW JERSEY.

AUTOMATIC FILLING-MACHINE.

1,075,903.  Specification of Letters Patent.  Patented Oct. 14, 1913.

Application filed October 17, 1911. Serial No. 855,157.

*To all whom it may concern:*

Be it known that I, HAYWOOD GUION DEWEY, a citizen of the United States, residing at East Orange, in the county of Essex and State of New Jersey, have invented certain new and useful Improvements in Automatic Filling-Machines; and I do hereby declare the following to be a full, clear, and exact description of the invention, such as will enable others skilled in the art to which it appertains to make and use the same.

This invention relates to a machine for weighing predetermined quantities of powder or other finely divided material, and then packing it into cans or other containers.

It has for its object to provide an automatic weighing mechanism which segregates a predetermined quantity of powder, a conveying mechanism to position the cans or receptacles for the reception of the powder, a packing mechanism by which the powder is filled into the cans, an exhaustive mechanism by which the air is exhausted from the cans during the filling operation, and suitable clutch and cam devices for automatically controlling the various parts and causing them to coöperate to first weigh the powder, then pack or fill the cans with the same, while exhausting the air therefrom, and lastly, to restore all the parts to their original position ready for another cycle of operation.

To these ends the invention comprises the novel details of construction and combinations of parts providing a rapid, positive and efficient automatic weighing means adapted to weigh one or a plurality of charges of powder, and to deliver the same to suitable packing or filling means which is controlled by the weighing mechanism, and which effectually prevents any noticeable loss of the finely divided material by spilling or dissipation, into the surrounding atmosphere. The whole being combined with suitable conveying means for the receptacles, to bring them successively into positions to be filled, and with suitable connecting mechanism by which all the various parts are so governed and timed as to cause the above operations to be positive, efficient, certain and automatic in action, all as will be more fully described hereinafter and particularly pointed out in the claims.

Referring to the accompanying drawings forming a part of this specification, in which like characters designate like parts in all the views:—

Figure 1 is a side elevational view of a machine built in accordance with my invention; Fig. 2 is a plan view of the machine with part of the automatic weighing mechanism omitted; Fig. 3 is a front elevational view with the automatic weighing mechanism, vacuum pump and vacuum tank removed; Fig. 4 is a cross sectional view taken on the line 4—4 of Fig. 2, and looking in the direction of the arrows; Fig. 5 is a cross sectional view taken on the line 5—5 of Fig. 2 and looking in the direction of the arrows; Fig. 6 is an enlarged detail view of the automatic weighing mechanism; Fig. 7 is a plan view of the parts shown in Fig. 6; Fig. 8 is an enlarged detail view of the automatic weighing mechanism similar to Fig. 6, but showing the parts in their extreme or cut-off position after the weighing operation is completed; Fig. 9 is an enlarged detail top plan view of a portion of the bucket discharging and clutch operating mechanisms; Fig. 10 is a detail perspective view of the inverted bottom of one of the scale buckets; Fig. 11 is a front elevational view of the parts shown in Fig. 9; Fig. 12 is a cross sectional view taken on the line 12—12 of Fig. 11, showing the scale bucket discharge mechanism; Fig. 13 is a front elevational view, similar to Fig. 11, of the parts shown in Fig. 9, but showing the discharging and clutch operating mechanism in their extreme positions; Fig. 14 is a cross sectional view taken on the line 14—14 of Fig. 13 and looking in the direction of the arrows; Fig. 15 is an enlarged detail view of a portion of the machine showing a portion of the manifold, lower portion of a packing chamber, and sliding bracket for supporting the same; Fig. 16 is a detail plan view of the slide valve with a part shown broken away for the sake of clearness; Fig. 17 is a side elevational view, partly in section, of the slide valve; Fig. 18 is a detail plan view of one of the perforated metal plates removed from the slide valve; Fig. 19 is a detail view showing the means for operating the packing chamber with the manifold connected thereto, and also showing the mercury seal in section: Fig. 20 is a plan view of the parts shown in Fig. 19 and also showing the side frames of the machine in section; Fig. 21 is a detail view showing the means for operating the slide valve; Fig. 22 is a detail view showing the means for operating the air exhaust valve; Fig. 23 is a plan view of the parts shown in Fig. 22; Fig. 24 is a detail view showing the means for dislodging any powder that may adhere to the walls of the chute; Fig. 25 is an enlarged detail view of the cross head partly in section, connected to one of the operating links; Fig. 26 is a plan view of the parts shown in Fig. 25; Fig. 27 is an end elevation of the same; Fig. 28 is an enlarged detail plan view, partly in section, of the packing chambers and manifold; Fig. 29 is a cross sectional view taken on the line 29—29 of Fig. 28, looking in the direction of the arrows; Fig. 30 is a horizontal cross sectional view taken on the line 30—30 of Fig. 29; Figs. 31, 32 and 33 are detail sectional views of the packers showing the different stages of the working parts during the process of packing, the chute being shown removed in Figs. 32 and 33; Figs. 34, 35, 36, 37 and 38 are diagrammatic views showing the steps necessary to the operation of filling a can or other receptacle on this machine with a predetermined amount of powder; and, Fig. 39 is a detail perspective view of a can filled with powder by this machine.

This machine comprises an automatic weighing means, a packing means, a can conveying or carrying means, and clutch and cam mechanisms, all so connected and timed, that a plurality of cans, or other containers, may be rapidly and successfully filled with a predetermined amount of powder, as will now appear.

In the preferred construction, shown in the drawings, the machine comprises three complete weighing, packing and can conveying mechanisms, all of which are under the control of one set of operating means, but for the sake of clearness, only one unit and its coacting operating means will be described in detail, it being understood that the other units are duplicates, and that as many other units as may be desired, may be added to the machine at will.

The machine is of the general shape and construction best shown in Figs. 1, 2 and 3 of the drawings, and is provided with the side frames A and B held together by the truss beams such as C and D, and the top or bed plate E, (Fig. 4).

Mounted on any suitable support, attached to the top plate E of the machine is a feed hopper 1, (see Figs. 1, 6, 7 and 8) which is adapted to receive powder or other material to be weighed and packed by the machine. Any suitable agitating means 2 to facilitate the feeding of the powder, may be mounted within the hopper and driven from any convenient source of power. This hopper is preferably provided at its discharge end with two rock shafts 3 (Figs. 3 and 7) on which are mounted the cut-off gates 4. Short arms 5—5 rigidly mounted on the ends of the rock shafts 3 are pivotally connected to the toggle levers 6 and 7, the lever 7 being extended beyond the movable stud 8 connecting said levers, and terminating in a weight 9. This stud 8 is of sufficient length to extend on its inner end between the guides 10, and has freely mounted on its outer end an anti-friction roller 11, which consequently travels in a vertical plane by reason of said stud 8 and guides 10. A trip trigger 12 is pivotally mounted on a stud 13 which is located below the roller 11 and approximately in the vertical line in which the said roller travels. This trigger 12 is preferably of the construction shown, and is provided with the short weighted arms 14 and a longer weighted arm 15, which arm 15 has pivotally mounted on its outer end a strip yoke 16.

The mechanism just described is known as the powder feed mechanism and is automatically controlled by the scale mechanism, which latter also controls the other movements of the machine which are in synchronism with the weighing operations, as will appear below.

Mounted in suitable bearings on the top plate E and running transversely the entire width of the machine is the clutch shaft 17 (see Figs. 1, 2, 4 and 5) which operates intermittently, making one revolution for each cycle of the machine, as will be described. Mounted also in suitable bearings on the top plate E, and running parallel with the shaft 17, is the constantly rotating main power shaft 18 which is driven by the pulley 19.

20 indicates a spur pinion rigidly fixed on the power shaft 18, which transmits power to the spur gear 21, loosely mounted on the clutch shaft 17. The spur gear 21 is provided with a series of clutch pockets 22 on its inner face (see Figs. 5 and 11) which pockets are adapted to receive the driving end of a pawl 23, which is pivotally mounted in the lug 24, carried by the spur gear 25, fast on the clutch shaft 17. Consequently, the spur gear 21, pawl 23, and spur gear 25, constitute a clutch which imparts motion to the clutch shaft 17, but of course any other suitable connection may be provided. The operation by which this clutch mechanism is controlled by the scale mechanism will now be described. Mounted on the bed plate E is the scale yoke or support 26 (Fig. 4) and on this support is the scale beam 27 which carries on one end the weight ing bucket 28 and on its other end the counter-balancing weight 29. The bottom 30 of the bucket is hinged as at 31 (see Figs. 11 and 12) and held in a closed position by the latch 32 pivoted on the side of the bucket. This latch 32 is provided with a trip arm 33 adapted to be operated by the movable trip 34 mounted on the trip shaft 35. Said trip shaft 35 is freely mounted in the brackets 36 on the top plate E of the machine and is of sufficient length to provide a trip 34 for each weighing unit as shown in Fig. 2. This trip 34 is struck by the arm 33 and releases the bottom 30 of the bucket when it has reached its lowest position after having received its predetermined amount of powder, as will be readily understood.

During the downward movement of the scale beam 27 under the influence of a predetermined amount of powder, the pin 300 carried by said beam (see Figs. 6 and 8) contacts with the bottom of the trip yoke 16 and displaces the trip trigger 12 from beneath the anti-friction roller 11 which allows the toggle levers 6 and 7 under the influence of the weight 9 to close the cut-off gates 4—4 and stop the flow of powder to the weighing bucket, as will be clear from the drawings.

The downward movement of the bucket 28 is limited by the scale beam 27 coming into contact with the adjustable stops 37 mounted on the arms of the scale beam support or yoke 26. The bottom 30 of the scale bucket is further provided with a counterweight 38 (Fig. 11) to return it to its closed position after the contents have been discharged, and at the same time the scale beam 27 under the influence of the weight 29 (Figs. 5 and 8) returns to its initial position to receive a subsequent charge of powder. Sufficient space is allowed between the pin 300 and the top of the trip yoke 16 to permit of the return of the scale beam 27.

As the bottom 30 of the weighing bucket swings downward to discharge the contents of said bucket, the lug 39 thereon (Figs. 10, 13 and 14) engages the pin 40 on the weighted lever 41, pivoted as at 42 to the top plate E. This engagement of the lug 39 carried by the bottom 30 with the pin 40, throws the weighted lever 41 to one side as shown in Fig. 13. During this movement the pin 43 also carried by the lever 41, moves in the slot 301 in the bar 44 (Figs. 11, 13 and 14) and the weighted lever 41 accumulates sufficient momentum to cause the pin 43 to move the bar 44 longitudinally and unhook the latch 45 pivoted on the top plate E. The unhooking of the latch 45 releases the holding arm 46 rigidly held on the rock shaft 47, which shaft is journaled in bearings 48 on the plate E (see Figs. 2 and 9), and runs across the machine substantially at right angles to the shaft 17. The movement of the rock shaft 47 under the influence of the weighted end of the arm 49 (Fig. 11) disengages the arm 50, of the bell crank lever 51, from the anti-friction roller 52, on one end of the pawl 23, which permits said pawl under the influence of the spring 53 to be thrown into engagement with one of the clutch pockets 22 in the face of the gear 21 and therefore causes power to be transmitted through said pawl to the shaft 17. The movement of the rock shaft 47 under the influence of the weighted arm 49 is limited by the lug 54 on the bell crank lever 51 contacting with the stop 55 carried by the top plate E.

As previously stated, the operation of one weighing unit only has been described. If, however, a plurality of units are employed, as in the construction shown in Fig. 2, it is evident that the rock shaft 47 will not be free to release the pawl 23 until all of the weighing buckets have discharged their contents, so that a new cycle of operations cannot be begun until each of the units is ready for it.

Rigidly mounted on the clutch shaft 17 is a cam 56 (Fig. 9), which engages the roller 57 carried on the end of an arm 58 rigidly mounted on the rock shaft 47. Early in the rotation of the clutch shaft 17, which is in the direction of the arrow (Figs. 9, 11 and 13) the roller 57 will follow under the influence of the weight 49 the face of the cam 56 and return the rock shaft 47 and the bell crank 51 to their initial positions; that is, from the positions shown in Fig. 13, to those shown in Fig. 11. This return movement brings the holding arm 46 of the bell crank into proper position to re-engage the pivoted latch 45 and also brings the arm 50 of said bell crank into the path of the anti-friction roller 52 so that upon the completion of one revolution of the clutch shaft 17 the clutch will be disengaged by reason of this anti-friction roller contacting with the said arm 50. Immediately following the action of the cam 56, the cam 59, which is also rigid with the clutch shaft 17, operates through the roller 60, lever 61, and reset bar 62, and pin 63 to return the weighted lever 41 to the position shown in Fig. 11. During this return movement of the lever 41, the pin 43 acting in the slot 301 in the bar 44 resets the pivoted latch 45 and causes the same to engage the holding arm 46 and to retain the rock shaft 47 and its coacting parts in their initial positions. The cam 59 after having reset the weighted arm 41 and pivoted latch 45, returns the reset bar 62 to its initial position leaving the weighted arm 41 free to perform a subsequent operation as has been previously described.

To prevent the scale bucket 28 from discharging its contents if it should receive a second charge of powder during a single cycle of operations, the trip 34 is lowered beyond a possible engagement with the trip arm 33 immediately after the machine starts, as shown by dotted lines in Fig. 12. This movement is effected by the cam 65, on the clutch shaft 17, through the roller 66, mounted on the cam bar 67, and lever 68. The trip 34 is returned to its upper or tripping position by the continued rotation of the cam 65 slightly in advance of the completion of the cycle of the clutch shaft 17. A set collar 69 (Figs. 9, 11 and 13) is mounted on the shaft 17 and abuts against the cam bar 67, as a keeper, to hold the cam bar in engagement with the cam.

From the mechanism so far disclosed, it will be clear that if power is constantly applied to the pulley 19, the operations of filling a bucket 28 with a predetermined amount of powder, and of the weighing mechanism which determines this amount, will so control the clutch mechanism 23 as to cause power to be automatically applied to the shaft 17 after each weighing operation. And further, if a plurality of weighing units are employed, power will not be applied to said shaft 17 until the last unit has completed its cycle of movements. It will also be clear that after the last weighing bucket has discharged its contents, the mechanisms will be automatically restored to their normal positions ready to repeat the original cycle of movements.

After the bottom 30 of a weighing bucket has been released by the latch 33, the contents of the bucket 28 passes down a chute 77 (Fig. 4) into the filling or packing mechanism which latter causes said contents to be suitably filled into the cans or receptacles 89, all as will be more fully disclosed hereinafter. Before the powder or other finely divided material however, is passed into the said cans, it is very desirable that the air should be withdrawn from the containers, in order to prevent the powder from floating in the air that would otherwise be contained therein, and also in order to prevent said air from interfering with the efficient action of the packing plungers. Therefore, it is very desirable to control the exhaustion of the containing vessels from the weighing mechanism, and to this end during the movement of the rock shaft 47, above described, and in addition to causing the clutch to transmit power to the shaft 17, the weighing mechanism also controls the air exhaust valve 5 (Figs. 2, 5, 22 and 23) by means of connections between said shaft 17 and said valve, as will appear more fully below. When a new cycle of operations begins, a cam 70 (Figs. 2, 3, 7 and 8) rigidly mounted on the clutch shaft 17 opens the powder cut-off gates 4—4 within the hopper 1, and allows a new charge of powder to flow into the weighing bucket 28. The opening of these cut-off gates 4—4 by the cam 70 is effected through the connections comprising a roller 71 on the cam connections 72 which is pivotally connected to the short arm 73 rigidly fixed to the rock shaft 74. A lifting arm 75 also rigidly fixed to the rock shaft 74 contacts at its lower end with the weight 9 and elevates it from the position shown in full lines in Fig. 8 to that shown in dotted lines, and during this movement the toggle levers 6 and 7 by reason of their pivot connection at 8 elevate the anti-friction roller 11 and allows the trip trigger 12 to assume the position shown in Fig. 6 supporting the weight 9, and holding the cut-off gates 4—4 in their open position.

76 indicates a stop pin in the side wall of the hopper to limit the upward movement of the lever 15 and therefore the swinging movement of the trip trigger 12.

The continued rotation of the cam 70 returns the lifting arm 75 to its initial position shown in Fig. 6, where it remains during the completion of the new cycle of movements leaving the weight 9 free to fall and again close the cut-off gates 4—4 as previously described.

Having described one complete cycle of movements including the weighing of a charge of material and the manner in which the scale mechanism operates to control and start the shaft 17, I will now proceed with the description of the packing mechanism, it being supposed that a can 89 is in position to receive a charge of powder.

Referring to Fig. 4, it will be seen that when the powder has been discharged from the weighing bucket 28, it will enter the chute 77 as previously stated, and will be directed through the branch connection 78 into the powder receiving chamber 304 of the packing chamber or unit 79. This packing unit 79 (Figs. 4, 28, 29, 30, 31, 32 and 33) is provided with a vertical powder receiving chamber 304, a horizontal slide valve seat 80, suitable vertical and horizontal air passages 81, and 82 (Figs. 30, 31, 32 and 33) and end flanges 83. These end flanges are for the purpose of bolting a plurality of packing chambers or units 79 together and to the end slide brackets 90 and 91, as shown.

A bottom plate 84 is secured to the under side of the packing unit 79, and forms the bottom wall of the valve seat 80. This plate 84 is provided with an opening 85 which registers with the powder receiving chamber 304 (Figs. 4, 15, 28, 29 and 30 to 38). An annular groove 86 surrounds the opening 85 and has mounted therein a packing gasket 87 of any suitable material. This packing gasket 87 is retained in its annular groove 86 by the gland 88 which is flared on its inner face to act as a guide for the mouth of a can 89 and insure the proper sealing of the same by the packing gasket (Figs. 31 to 38), as will appear below. Secured to the end flanges 83 of the packing chamber 79 are two sliding guide brackets 90 and 91 (Figs. 1, 3, 5, 15, 19, 20 and 21) which are adapted to travel vertically in the guide ways 92 and 93 in the side frames A and B of the machine, when the packing chamber unit 79 is moved up and down, as will be hereinafter described. Carried by the guide brackets 90 and 91 (Figs. 15, 20, 28 and 29) is a manifold air conduit 94 to which the packing unit 79 is rigidly secured as by the flange 95. This air conduit 94 carries the flange 96 (Figs. 19, 20 and 28) which joins the exhaust air pipe line 177, which will be described below. An opening 97 (Figs. 28 and 29) in the manifold air conduit 94 communicates with the vertical passage 81 and forms a continuous passage from the valve seat 80 to the main body 98 of the manifold. This manifold serves the double purpose of an exhaust conduit and a truss for tying the side brackets 90 and 91 and a plurality of packing chamber units 79 together, and it may be made of any suitable length to provide a plurality of openings 97 corresponding with any desired number of packing units.

It will be inferred from the foregoing description and by reference to Figs. 3, 15 and 20 that being rigidly connected together, the packing chambers or units 79, manifold 94, and end brackets 90 and 91 comprise a movable reciprocating section of the packing mechanism which is raised and lowered in proper time with the other coacting parts of the machine to permit the empty cans to be properly positioned, by means now to be described.

As the clutch shaft 17 rotates by reason of the engagement of the clutch mechanism 23 with the gears 24, a slow described motion is imparted from the gear 25 to the idle pinion 100, pinion 101, mounted on the other end of the short shaft 102, thence through the pinion 103 (Fig. 3) on the lower end of said shaft 102, to gear 104 and to the shaft 105, as will be clear from Figs. 1, 3, and 5.

The ratio of the gearing is such that one revolution of the shaft 105 coincides with one revolution of the clutch shaft 17, and takes place in substantially the time interval of time.

Rigidly mounted on the shaft 105 is a cam 106 (Figs. 3, 4 and 21) which through the roller 107, cam lever 108 and lifting arms 109, on the rock shaft 110, imparts motion through the adjustable connections 111 (Figs. 19 and 20) to the guide brackets 90 and 91 and raises and lowers the end movable section of the packing mechanism. The connections 111 are pivotally connected to the lifting arms 109 by the pins 112, and to the brackets 90 and 91 by the studs 113.

The slide valve 114 and its coacting parts will now be described. This slide valve 114 (Figs. 16, 17, 30 to 33) fits within the valve seat 80 of the packing chamber unit 79 and is adapted to be laterally reciprocated, transversely of the powder receiving chambers 304, as will now appear.

115 indicates an opening of substantially the same shape and size as the powder receiving chamber 304, as well as of the opening 85 in the bottom plate 84, and it coincides with said chamber and opening 85 when brought into alinement therewith; forming, in effect, one continuous passage through which the powder is introduced into a can. Adjacent to the opening 115 is a similar opening 116 over which is fitted in a countersunk recess 117 a perforated plate 118 (Fig. 18). This perforated plate 118 supports, and has securely fastened thereto, a piece of foraminous material 119 of substantially its own shape and size (Figs. 16 and 17). The perforated plate 118 and the foraminous material 119 are secured in any suitable manner within the countersunk recess 117, and the foraminous material is made flush with the upper face of the slide valve. Within the body of the valve is formed an elongated port 120 which intersects the opening 116 and has at one end a port 121 adapted to register with the passage 82 and passing through the upper face of the valve, while a port 122 passes through the side face of the slide valve. When suction is applied through the passage 120, port 121, passages 82 and 81, air is sucked through the foraminous plate leaving the powder behind, as will appear more fully below. The mechanism for reciprocating this slide valve 114 and bringing its parts into register with their passages at the proper time, consists of a crank 123 (Fig. 21), the shaft 305 which is journaled in the bearing 124 mounted on the side frame A of the machine and operated by connections that will presently appear (Figs. 1, 3, 15 and 21). The crank 123 is connected through the pitman 125 and eccentric pin 126 to the slide valve 114. The throw of said crank is such as to give a movement to the slide valve 114 substantially equal to the distance from center to center of the openings 115 and 116.

To compensate for any inaccuracy in the movement of the valve 114, the eccentric pin 126 may be rotated in the bearings 127 on the end of the slide valve and secured in the desired position by the locking screw 128, as will appear from Figs. 15 and 21.

The rotative movement of the crank 123 and shaft 305 (Figs. 1, 3 and 21) is had from the shaft 105 by means of the valve intermittent driving gear 129, secured thereto, the intermittently driven gear 130 on the end of shaft 131, and the miter gears 132, 133, 134 and 135, the miter gear 135 being rigidly secured to the crank shaft 305.

It will be understood from the drawings that the valve intermittent gears 129 and 130 are so timed that for every revolution of the shaft 105, two distinct movements of substantially one-half a revolution each, with a period of rest between, will be imparted to the crank 123.

In order that the movable section of the packing chamber mechanism may be raised and lowered, as described, without interfering with the motion of the crank 123, a sliding journal bearing 136 (Fig. 15) mounted thereon is fitted free to move within the guides 137 (Figs. 15 and 28) on the guide bracket 90.

It will now be clear from the foregoing that when the weighing mechanism has caused a weighing bucket 28 to empty its contents into the chute 77, the slide valve 114 will be in the position shown in Figs. 31 and 32, with the covered opening 116 in register with the powder chamber 304. The shaft 105 is now being rotated and a cycle of operations follow comprising the raising of the packing units 79 to permit the cans to be fed into positions for filling, the lowering of said units to effectually seal the cans from the outer atmosphere, as shown in Figs. 31, 32 and 33, the exhaustion of the air from the powder and the various passages, as well as the packing of the powder without waste, all as will now be more fully disclosed.

The operation of the packing plunger, its associated cross head and connecting parts is as follows:—The plunger consists of a body 138 (Figs. 4, 31, 32, and 33) preferably of wood, for the sake of lightness, and mounted to be freely moved through the packing chamber 304 and opening 115, within the slide valve 114, during the packing operation. A plunger head 139, preferably of rubber or other resilient material is secured to the lower end of the plunger 138, and fits snugly, but free to move, within the said powder receiving chamber 304, and opening 115. A packing ring 306 of fibrous material is held in an annular groove in the chute base 307, and forms a joint around the plunger 138 to prevent any of the powder escaping when a charge is being delivered from the scale bucket 28 into the powder receiving chamber 304. Secured to the upper end of the plunger body 138 is a cap plate 140 to which is secured, by the screws 141, a locking plate 142 (Figs. 25, 26 and 33). This plate 142, by reason of having sufficient play in the holes through which the screws 141' pass, allows the plunger to accommodate itself to any slight disalinement with the packing chamber. Said plate 142 co-acting with the dogs 143, also detachably secures the plunger within the opening 145 of the cross-head 144, which opening is of sufficient size to allow the plunger to pass freely through the same when an abnormal pressure is encountered.

146 indicates studs on which the dogs 143 are pivoted, which dogs are held in engagement with the locking plate 142 by the springs 147. The tension of the springs 147 may be regulated by the threaded eye bolts 148, (see Figs. 25 and 33). The cross-head 144 is secured to the end brackets 149 which are adapted to travel within vertical guides 150 in the side frames. (Figs. 1, 5, 25 and 27.) The means which impart a vertical reciprocatory movement to the cross-head 144, for operating the plunger within the packing unit 79 consist of the plunger, intermittent driving gear 151 (Fig. 1) secured to the shaft 105, and an intermittently driven gear 152, which is secured to the crank shaft 153, rotatably mounted in suitable bearings in the side frames, (see Figs. 1, 2, 3, and 5). Rigidly fixed to the outer ends of the crank shaft 153, and on the outside of the frames A and B are cranks 154, which through adjustable connecting rods 155 reciprocate the rocking levers 156. These levers 156 are fulcrumed at one end as at 157 (Figs. 1 and 4) to the side frames A and B and at their other end are pivotally connected by the links 158 to the end brackets 149 of the cross head 144. The plunger intermittent gears 151 and 152 are so proportioned as to properly time the movement of the cross head 144 with respect to the slide valve 114, and to impart one revolution to the crank shaft 153 for each intermittent revolution of the clutch shaft 17 but in a shorter interval of time.

During the movement of the cross head, if the plunger should meet with any abnormal obstruction in its downward stroke such as an overcharge of powder or an inverted can, the plunger will be released by reason of the springs 147 yielding and allowing the dogs 143 to move out of engagement with the plate 142. When the cross head 144 is returned to its initial or upper position, the plunger 138 is forced back into its normal position by the plate 142 contacting with the adjustable set screw 315 threaded in the framework (Figs. 25 and 26).

As has been previously described, the powder discharged from the weighing bucket 28 passes through the chute 77 and branch connection 78 to the powder receiving chamber 304. For the purpose of dislodging any powder that may adhere to the sides of the chute 77 and connection 78 a trip hammer 160 (Figs. 2, 3, 4 and 24) is loosely mounted on the hammer shaft 161, journaled at one end in the side frame B and at the opposite end in the bracket 162 (Fig. 3) attached to the side frame A of the machine.

The operation of the trip hammer 160 is as follows:—As the shaft 105 rotates, the roller 163 carried by the arm 164 rigidly fixed to the shaft (Figs. 3 and 24) engages the trip finger 165, which, being rigidly fixed to the shaft 161, elevates the trip hammer 160 to the position shown in dotted lines in Fig. 24. As the shaft 105 continues to rotate, the roller 163 passes out of engagement with the trip finger 165 and allows the trip hammer 160 to fall on the anvil pin 166, secured to the side of the chute 77. The hammer 160 is held against lateral movement by the pin 167 on the shaft 161, but is free to have a slight rotative movement the purpose of which is, when employing a plurality of trip hammers (Figs. 2 and 3) to allow for any error in the alinement of a corresponding number of anvil pins. However, only one trip finger 165 need be employed for any desired number of units, as will be clear from Fig. 3.

The mechanism thus far disclosed, it will be clear from the foregoing, weighs out a predetermined amount of powder, delivers the same into a chamber, raises the chamber and its coacting parts to permit an empty receptacle to be positioned, lowers said chamber to seal said receptacle from the outer air, and by the means of plungers packs the material in the receptacle. But in dealing with finely divided powders, it is very desirable to fill the receptacles after they are exhausted of their contained air for reasons that will presently appear, and to this end the air exhausting means will now be disclosed. As has been stated above, the same movement of the rock shaft 47 (Figs. 2 and 5) which throws the clutch 23 into engagement and starts the rotation of the clutch shaft 17 to start the machine, also opens the exhaust air valve F (Figs. 1, 2, 5, 22 and 23), as will now be described.

When the powder is discharged from the weighing bucket 28, and the rock shaft 47 is released, the arm 168 (Fig. 5) mounted on rock shaft 47 imparts a downward movement to the slotted reach rod 169 and through the arm 170 of the three arm lever 171, mounted on the valve stem 172, moves the vane 173 (Figs. 22 and 23) of the exhaust air valve F, to its open position. During the return movement of the rock shaft 47, the slotted reach rod 169 is withdrawn leaving the exhaust air valve F in an open position, by reason of the pin 174 on the arm 170, traveling within the slot 175 at the lower end of the reach rod 169. A counter-weighted arm 176 of the three arm lever 171 further retains the valve open or closed according to its position.

The opening of the exhaust air valve F allows the air to be exhausted through the pipe line 177 and manifold air conduit 94 (see arrows) from the can 89 to the vacuum tank 178 in which a partial vacuum is maintained, by the air pump 179, (Figs. 1 and 2). Just before the machine completes a cycle of operations, the exhaust air valve F is closed by means of an arm 180 (Figs. 1, 5, 22 and 23) on the shaft 105, which brings the pin 181, mounted thereon, in contact with the bell-crank arm 182 pivotally mounted as at 183 on a bracket 184 held to the side frame A of the machine (Figs. 1, 5, and 22). The bell crank 182 is connected to the three arm lever 171 of the air exhaust valve F, by the link 185, which three arm lever is free to return to its initial or closed position by reason of the pin 174 traveling in the slot 175.

In order that the pipe line 177 may not interfere with the free up and down movements of the movable section of the packing chamber mechanism to which it is attached as at 96 (Fig. 19) a mercury seal 186 (Figs. 1, 2, 5 and 19) is interposed in the pipe line 177.

It will be seen from Fig. 19 that when the movable section of the packing chamber mechanism is operated by the cam 106 the movable nipple 187 will have a free movement within the mercury cup 189. A stationary inner nipple 188, threaded in the mercury cup 189, telescopes within the movable nipple 187, the space 190 between the two nipples being sealed by the body of mercury 191.

Having described the automatic weighing mechanism, the clutch mechanism, and the packing mechanism, I will now describe the conveying mechanism by which the containers are brought into position to be sealed and filled. As has been previously stated, a can 89 was supposed to be in position to receive a charge of powder during the foregoing operations. In order to properly and automatically position these receptacles, a series of cans 89 are supported on the tracks 192 (Figs. 1, 2, 4 and 32), which are secured to the truss bars C and D of the frame of the machine. The cans 89 are retained in position on the tracks 192, by the guides 193 (Fig. 2) and are advanced at the proper time by the fingers 194 (Fig. 4) properly spaced on and attached to the chains 195. These chains 195 run on sprockets 196, rigid on the shaft 197, which shaft receives an intermittent movement from the cam 198 (Figs. 1 and 2) rigidly mounted on the end of the clutch shaft 17, through the roller 199, cam bar 200, ratchet arm 201, loosely mounted on the shaft 197, pawl 202 and ratchet wheel 203 rigid with the shaft 197 (Figs. 1, 2, 3 and 5). The shaft 197 is journaled in extension brackets 204 which project in the rear of the frame of the machine. The tracks 192 and chains 195 may be of any desired length and supported in any convenient manner at any distance from the machine on the front, or side opposite to the shaft 197.

Having described in detail the different mechanisms employed in carrying out this invention, I will proceed now to describe one complete cycle, embracing all the various operations of the machine.

Previous to starting the machine, it must be understood that empty cans 89 have been properly placed in position on the track 192, and one can is in its proper position under the packing chamber (Fig. 34). In order to accomplish the proper alining of the can with the packing chamber, the machine must be allowed to make one complete cycle by throwing the clutch into engagement by hand, before the powder cut-off gates 4 are operated.

When the hopper 1 is filled with powder and power is supplied to the pulley 19, the power shaft 18 is given constant rotation in the direction of the arrow. The powder cut-off gates 4 within the hopper 1 are now opened by hand to the position shown in Fig. 6 allowing powder to flow to the scale bucket 28, which upon receiving a predetermined amount, will overbalance the scale beam 27 and move downward, shutting off the flow of powder by reason of the pin 300 on said beam, tripping the trip trigger 12, and permitting the toggle levers 6 and 7 to close the gates 4 under the influence of the weight 9 (Fig. 8). The continued downward movement of the scale bucket 28 (Fig. 13) brings the trip arm 33 of the latch 32 in contact with the trip 34, releases the bucket bottom 30 and causes the discharge of the powder into the chute 77. The downward swinging of the bucket bottom 30 throws the weighted arm 41 over the center and through the bar 44, unhooks the latch 45 from the holding arm 46 leaving the rock shaft 47 free to rock, and throw the clutch into engagement, which movement through the link 169 also opens the exhaust air valve F (Figs. 5 and 22). It will be seen that the opening of the valve F is substantially coincident with the discharge of the powder into the chute 77. The exhaust air valve F being open as the charge of powder is falling into the powder receiving chamber 304, there is an induced current of air flowing down through the chute 77, powder receiving chamber 304, foraminous material 119 and up through ports 82, 81 and manifold 94 to the exhaust air line 177 (Figs. 4, 28, 29 and 30). This current of air sucks or sweeps the charge of powder down into the receiving chamber, preventing the puffing out of dust into the surrounding atmosphere, as is usual in operations of similar nature.

The scale bucket 28 and scale beam 27 being relieved of the weight of a charge of powder return immediately to the position shown in Fig. 6, under the influence of the weight 29. During this return movement the bucket bottom 30 is closed by counterbalancing weight 38. The scale mechanism is now in position to receive a subsequent charge of powder. Closely following the starting of the clutch shaft 17 the rock shaft 47 returns to its initial position, (Fig. 11) by the cam 56 acting through the arm 58; and the cam 59 is so timed as to reset the weighted lever 41 and return latch 45 through the arm 61 and reset bar 62. The rock shaft 47 is now held in its locked position until the shaft 17 has completed one revolution, when the clutch is disengaged through the action of the arm 50 engaging the anti-friction roller 52. Substantially coincident with the action of arms 56 and 59, the cam 65 throws the trip 34 out of possible engagement with the trip arm 33 and prevents any further discharge of powder from scale bucket 28 if the same should receive a second load, during the same cycle of the machine. The trip 34 is returned to its initial or tripping position slightly, in advance of the disengagement of the clutch and of the stoppage of the clutch shaft 17.

While the foregoing operations are taking place, and early in the beginning of the rotation of the clutch shaft 17, the cam 70 (Figs. 6 and 8) thereon, by means of the arms 73 and 75 automatically opens the gates 4, and returns the arm 73 to its initial or down position. The trigger 12 under the influence of the weight 14 is also returned to its initial position supporting the roller 11, and holding the gates 4 open until tripped by the poising of the scale beam 27 during a subsequent operation.

When a charge of powder is weighed and discharged, as has been just described, the cross head 144 carrying the plunger 138 is in its upper or elevated position (Figs. 1-4 and 31), and the slide valve 114 is in the position shown in Figs. 31 and 32. When in this position, the covered opening 116 in the slide valve is in register with the powder receiving chamber, and the piece of foraminous material 119 with its perforated supporting plate 118 is interposed between the falling charge of powder and the mouth of the can 89. Substantially at this moment the trip hammer 160 (Figs. 3, 5 and 24) falls on the anvil pin 166 by reason of the roller 163 passing out of engagement with the trip finger 165. It being understood that shaft 105 is rotating by means of power being transmitted thereto from clutch shaft 17 through the gears 25, 100, 101, 103 and 104, (Fig. 3). The vibration due to the impact of the hammer 160 on anvil pin 166 prevents any powder from adhering to the chute 77 and branch connection 78.

Closely following the action of the trip hammer 160, the plunger intermittent driving gear 151 (Figs. 1, 3 and 5) engages the intermittently driven gear 152 and imparts movement to the crank shaft 153 which, rotating in the direction of the arrow, through the co-acting parts 155, 156 and 158, moves the cross head 144 down, in the guides 150, in the side frames A and B of the machine. The first engagement of the plunger intermittent gears 151 and 152 moves the cross head and plunger 138 from the position shown in Fig. 31 to that shown in Fig. 32, compressing the charge of powder, which has previously been introduced into the powder receiving chamber 304. The plunger intermittent gears 151 and 152 now disengage and run idle for a slight interval allowing the plunger 138 to dwell in the position shown in Fig. 32. This initial movement of the cross head and plunger has the effect of compressing the charge of powder into a compact mass; the volume of which is slightly less than the capacity of the can 89. During this compression operation a large proportion of the air entrained within the powder is forced out (Fig. 33) and escapes through the foraminous material 119, ports 120, 121, 82, 81 and manifold 94 into the exhaust air line. It may be seen that this compressed charge of powder resting on the foraminous covering 119 of the opening 115, in the slide valve, forms a complete closure for the same, leaving the mouth of the can 89 in communication with the ports 120, 121, 82, 81, manifold 94, and through the same with the exhaust air line 177. The mouth of the can, however, is sealed against atmosphere by the rubber gasket 87 in the bottom plate 84 of the packing chamber. (Figs. 22 and 35). The partial vacuum maintained in the vacuum tank 178 now causes the evacuation of a portion of the air from the can, as shown by the arrows in Figs. 31, 32 and 35.

During the dwell in the plunger intermittent gears 151 and 152 and while the plunger 138 remains stationary as in Fig. 32, the valve intermittent gears 129 and 130, (Figs. 1 and 5), through the miter gears 132, 133, 134 and 135 and crank 123 actuate the slide valve 114 and move it from the position shown in Figs. 31 and 32 to the position shown in Fig. 33, when they disengage. This movement of the slide valve causes the closure of the port 121, brings the opening 115 in register with the powder receiving chamber 304, and also causes the port 122 to register with the orifices 340 in the side of the valve seat 80 (Figs. 29, 30 and 33) which permits the atmosphere to enter and pass through the perforated plate 118 and foraminous material 119 for the purpose of dislodging any powder that may have adhered thereto during the compressing operation, leaving the same clean for the next operation. The atmosphere passing through the foraminous material 119 is swept into the air exhaust line 177 through the ports 82—81 and the manifold 94 (see arrows in Figs. 29, 30 and 33).

During the disengagement of the valve intermittent gears 129 and 130, and while the slide valve, by reason of this disengagement, remains stationary, as shown in Fig. 33, the plunger intermittent gears 151 and 152 reëngage and actuate the cross head bringing the plunger from the position shown in Fig. 32 to that shown in Fig. 33 and forcing the compressed charge of powder through the valve opening 115 into the partially evacuated can. The cross head and plunger are now returned to their initial or elevated position by reason of the crank 154 passing beyond its lower center by the continued action of the plunger intermittent gears which then disengage. As soon as the plunger has been withdrawn sufficiently to clear the slide valve, the slide valve intermittent gears reëngage and return the slide valve to its initial position, when they are again disengaged until the next cycle of the machine.

Substantially coincident with the last described operations the exhaust air valve F is caused to close by the arm 180 (Figs. 1, 5, 22 and 23) actuating the bell crank 182 and through the link 185 the three arm lever 171 mounted on the valve stem 172. After a charge of powder has been forced into a can and substantially at the moment when the movement of the plunger is reversed, from the downward to the upper stroke, the packing chamber is slightly raised (Fig. 37) in advance of the upward movement of the plunger, by the cam 106 (Figs. 4, 19 and 20). This is for the purpose of admitting the atmosphere and equalizing the pressure within and without the can before the plunger is withdrawn and prevents any of the powder being lifted out of the can by the upward movement of the plunger. The packing chamber is held in this slightly raised position, until the plunger is well advanced in its upper stroke, when it is again raised to the position shown in Fig. 38, entirely clear of the can. The filled can is now moved forward and an empty one brought in position by the fingers 194 on the chain 195, which chain is operated by the cam 198 and ratchet lever 201. The cams 198 and 106 are so timed that as the empty can is brought into position, the packing chamber is lowered over the mouth of the same, sealing it for a subsequent operation. This being the final operation of the machine, the clutch now disengages, which completes the cycle.

It is obvious that those skilled in the art may vary the details of construction and the arrangement of parts without departing from the spirit of my invention, and therefore I do not wish to be limited to the above disclosure except as may be required by the claims.

What I claim is:—

1. In a filling machine, the combination of means for segregating a predetermined quantity of material; means for filling said material into a suitable receptacle; means to exhaust the air from said receptacle; and connections controlled by said segregating means adapted to govern the air exhausting means, substantially as described.

2. In a filling machine, the combination of means for segregating a predetermined quantity of material; means for filling said material into a suitable receptacle; means to exhaust the air from said receptacle; and connections controlled by said segregating means adapted to govern both the filling and the air exhausting means, substantially as described.

3. In a filling machine, the combination of means for segregating a predetermined quantity of finely divided material; means for filling said material into a suitable receptacle; means for positioning said receptacle for receiving said material; means to exhaust the air from said receptacle after it is positioned; and connections governed by said segregating means adapted to control the filling and air exhausting operations, substantially as described.

4. In a filling machine, the combination of means for segregating a predetermined quantity of finely divided material; means for filling said material into a suitable receptacle; means for positioning and sealing from the outer air said receptacle for receiving said material; means to exhaust the air from said receptacle after it is positioned and sealed, but before it is filled; and connections governed by said segregating means adapted to control the filling and air exhausting operations, substantially as described.

5. In a filling machine, the combination of means for segregating a predetermined quantity of finely divided material; means for filling said material into a suitable receptacle; means for positioning and sealing said receptacle for receiving said material; means to exhaust the air from said receptacle after it is positioned and sealed, but before it is filled; and connections governed by said segregating means adapted to control the receptacle positioning, as well as the filling and air exhausting operations, substantially as described.

6. In a filling machine, the combination of means for weighing a predetermined quantity of powder; means for temporarily holding said powder after it is weighed; and means for exhausting the air from said powder while in said temporary receiving means, substantially as described.

7. In a filling machine, the combination of means for weighing a predetermined quantity of powder; means for temporarily holding said powder after it is weighed; means for compacting said powder while in said temporary holder; and means for exhausting the air from said powder while in said temporary receiving means, substantially as described.

8. In a filling machine, the combination of means for weighing a predetermined quantity of powder; means for temporarily holding said powder after it is weighed; means for compacting said powder while in said temporary holder; means to deliver said powder from said holder to a receptacle; and means for exhausting the air from said powder while in said temporary receiving means, substantially as described.

9. In a filling machine, the combination of means for weighing a predetermined quantity of powder; means for temporarily holding said powder after it is weighed; a plunger for temporarily compacting said powder while in said holder; a foraminous plate for supporting said powder while in said holder; and means for exhausting the air from said powder while in said temporary receiving means, substantially as described.

10. In a filling machine, the combination of means for weighing a predetermined amount of powder; a temporary holder for the weighed powder; means to compact said powder while in said holder; means to exhaust the air from said powder while in said holder; and connections governed by said weighing means adapted to control the compacting and air exhausting operations, substantially as described.

11. In a filling machine, the combination of means for weighing a predetermined amount of powder; a temporary holder for the weighed powder; means to compact said powder while in said holder; means to exhaust the air from said powder while in said holder; a foraminous plate for supporting the powder while in said holder; means for filling said powder from said holder into a receptacle; and connections governed by said weighing means adapted to control the compacting, the filling, and the air exhausting operations, substantially as described.

12. In a filling machine, the combination of means for weighing a predetermined amount of powder; a temporary holder for the weighed powder; means to compact said powder while in said holder; means to exhaust the air from said powder while in said holder; a valve provided with a foraminous plate for supporting said powder while in said holder; means to position and seal from the atmosphere a receptacle adapted to receive said powder; and connections governed by said weighing means adapted to control the compacting, the filling, the positioning, and the air exhausting operations, substantially as described.

13. In a powder filling machine, the combination of means for segregating a predetermined quantity of powder; a rotating shaft; means associated with said segregating means for governing the rotations of said shaft; a compacting chamber adapted to receive said powder from said segregating means; means in said chamber for compacting said powder; means for exhausting the air from said compacted powder; and means governed by said rotating shaft for controlling the compacting operations, substantially as described.

14. In a powder filling machine, the combination of means for segregating a predetermined quantity of powder; a rotating shaft; means associated with said segregating means for governing the rotations of said shaft; a compacting chamber adapted to receive said powder from said segregating means; means in said chamber for compacting said powder; means for exhausting the air from said compacted powder; means controlled by said shaft for governing the air exhausting operations; and means governed by said rotating shaft for controlling the compacting operations, substantially as described.

15. In a powder filling machine, the combination of means for segregating a predetermined quantity of powder; a rotating shaft; means associated with said segregating means for governing the rotations of said shaft; a compacting chamber provided with a foraminous bottom adapted to receive said powder from said segregating means; means in said chamber comprising a reciprocating plunger for compacting said powder; means for exhausting the air from said compacted powder; means controlled by said shaft for governing the air exhausting operations; and means governed by said rotating shaft for controlling the compacting operations, substantially as described.

16. In a powder filling machine, the combination of means for segregating a predetermined quantity of powder; a rotating shaft; means associated with said segregating means for controlling the rotations of said shaft; a compacting chamber provided with a foraminous bottom adapted to receive said powder from said segregating means; means comprising a cross head and plunger for compacting the powder in said chamber; means governed by said shaft for controlling the movements of said plunger; means comprising a pipe and valve for exhausting the air from said compacted powder; and means governed by said rotating shaft for operating said valve, substantially as described.

17. In a powder filling machine, the combination of means for segregating a predetermined quantity of powder; a rotating shaft; means associated with said segregating means for controlling the rotations of said shaft; a compacting chamber provided with a foraminous bottom adapted to receive said powder from said segregating means; means comprising a cross head and plunger for compacting the powder in said chamber; means governed by said shaft for controlling the movements of said plunger; means comprising a pipe and valve for exhausting the air from said compacted powder; means governed by said rotating shaft for operating said valve; means for sealing against the outer atmosphere a container in register with said chamber and bottom; and means to deliver said powder into said container, substantially as described.

18. In a powder filling machine, the combination of a compacting chamber having a movable foraminous bottom; means for sealing a container against the atmosphere in register with said chamber and bottom; means for compacting powder in said chamber; means for exhausting the air from said powder and container; and means for moving said bottom and filling said powder into said container, substantially as described.

19. In a powder filling machine, the combination of a compacting chamber having a movable foraminous bottom; means for raising and lowering said chamber and sealing a container against the atmosphere in register with said chamber and bottom; means comprising a reciprocating plunger for compacting powder in said chamber; means for exhausting the air from said powder and container; and means for moving said bottom and filling said powder into said container, substantially as described.

20. In a powder filling machine, the combination of a compacting chamber having a movable foraminous bottom; means for sealing a container against the atmosphere in register with said chamber and bottom; means for compacting powder in said chamber; means for exhausting the air from said powder and container; means for moving said bottom and filling said powder into said container; a rotating shaft; means associated with said shaft for governing the compacting operations; means associated with said shaft for governing the bottom moving operations; and means associated with said shaft governing the chamber raising and lowering operations, substantially as described.

21. In a powder filling machine, the combination of means for compacting powdered material; means for exhausting the air from said material; means for filling said material into a receiver the air from which has also been exhausted; and means governing the compacting, the air exhausting as well as the filling operations, substantially as described.

22. In a powder filling machine, the combination of means for compacting powdered material; means for exhausting the air from said material; means for filling said material into a receiver the air from which has also been exhausted; and means comprising a rotating shaft and clutch for transmitting power to said shaft for governing the compacting, the air exhausting as well as the filling operations, substantially as described.

23. In a powder filling machine, the combination of a chamber provided with a movable foraminous bottom; a plunger for compacting powder in said chamber; means to raise and lower said chamber to seal from the outer atmosphere a can in register with said chamber and bottom; means comprising a valve for exhausting air from the compacted powder and can; and means to move said bottom to permit said compacted powder to fill said exhausted can, substantially as described.

24. In a powder filling machine, the combination of a chamber provided with a movable foraminous bottom; a plunger for compacting powder in said chamber; means to raise and lower said chamber to seal from the outer atmosphere a can in register with said chamber and bottom; means comprising a valve for exhausting air from the compacted powder and can; means to move said bottom to permit said compacted powder to fill said exhausted can; and means governing the compacting, the sealing, the air exhausting, as well as the bottom moving operations, substantially as described.

25. In a powder filling machine, the combination of a chamber provided with a movable foraminous bottom; a plunger for compacting powder in said chamber; means to raise and lower said chamber to seal from the outer atmosphere a can in register with said chamber and bottom; means comprising a valve for exhausting air from the compacted powder and can; means to move said bottom to permit said compacted powder to fill said exhausted can; and means comprising a rotating shaft and clutch for governing the compacting, the sealing, the air exhausting, as well as the bottom moving operations, substantially as described.

26. In a powder filling machine, the combination of a filling chamber; means to raise and lower said chamber to permit a can to be placed in register therewith; means to seal said can from the atmosphere while in register with said chamber; means to exhaust the air from said can and chamber; means to fill material into said can while in its exhausted condition; and means to slightly raise said chamber and permit air to leak into said can before opening it to the atmosphere, substantially as described.

27. In a powder filling machine the combination of a filling chamber; means to raise and lower said chamber to permit a can to be placed in register therewith; means to seal said can from the atmosphere while in register with said chamber; means to exhaust the air from said can and chamber; means to fill material into said can while in its exhausted condition; means to slightly raise said chamber and permit air to leak into said can before opening it to the atmosphere; and means to control the raising and lowering, the can exhausting, and the filling means, substantially as described.

28. In a powder filling machine, the combination of a filling chamber; means to raise and lower said chamber to permit a can to be placed in register therewith; means to seal said can from the atmosphere while in register with said chamber; means to exhaust the air from said can and chamber; means to fill material into said can while in its exhausted condition; means to slightly raise said chamber and permit air to leak into said can before opening it to the atmosphere; and a rotating shaft and clutch governing the rotations of said shaft for controlling the raising and lowering, the can exhausting and the filling operations, substantially as described.

29. In a powder filling machine, the combination of a filling means; means to raise and lower said filling means; means to bring a can into position to be filled by said filling means; sealing means carried by said filling means to seal said can against the outer atmosphere; means to exhaust the air from said can and filling means; and a rotating shaft adapted to control said raising and lowering, and said air exhausting operations, substantially as described.

30. In filling machine, the combination of means for segregating a predetermined quantity of material; means for filling said material into a suitable chamber; means to exhaust the air from said chamber as said material enters; means to compact said material in said chamber while continuing the air exhausting operation; and connections controlled by said segregating means adapted to govern the air exhausting means, substantially as described.

31. In a filling machine, the combination of means for segregating a predetermined quantity of material; means for filling said material into a suitable chamber; means to exhaust the air from said chamber as said material enters; means to compact said material in said chamber while continuing the air exhausting operation; and connections controlled by said segregating means adapted to govern both the compacting and the air exhausting means, substantially as described.

32. In a filling machine, the combination of means for segregating a predetermined quantity of finely divided material; means for conveying said material to a suitable chamber; means for exhausting the air from said chamber while said material is entering the same; means for compacting said material in said chamber while continuing the air exhausting operation; means for filling said material into a suitable receptacle; means for positioning said receptacle for receiving said material; and connections governed by said segregating means adapted to control the filling and air exhausting operations, substantially as described.

33. In a filling machine, the combination of means for segregating a predetermined quantity of finely divided material; means for conveying said material into a suitable chamber; means for filling said material into a suitable receptacle; means for positioning and sealing from the outer air said receptacle for receiving said material; means to exhaust the air from said receptacle after it is positioned and sealed, but before it is filled, said means also adapted to exhaust the air from said chamber while the material is entering the same; and connections governed by said segregating means adapted to control the filling and air exhausting operations, substantially as described.

34. In a filling machine, the combination of means for segregating a predetermined quantity of finely divided material; means for conveying said material into a suitable chamber; means for compacting said material in said chamber; means for filling said material into a suitable receptacle; means for positioning and sealing said receptacle for receiving said material; means to exhaust the air from said chamber while it is being filled with said powder, while it is being compacted, and from said receptacle after it is positioned and sealed, but before it is filled; and connections governed by said segregating means adapted to control the receptacle positioning, as well as the filling and air exhausting operations, substantially as described.

35. In a filling machine, the combination of means for weighing a predetermined quantity of powder; means for temporarily holding said powder after it is weighted; means for conveying said powder to its temporary holding means; means to tap said conveying means to prevent any powder adhering thereto; and means for exhausting the air from said powder while in said conveying and in said temporary receiving means, substantially as described.

36. In a filling machine, the combination of means for weighing a predetermined quantity of powder; means for temporarily holding said powder after it is weighed; a conveyer for leading said powder to its temporary holder; means to tap said conveyer while said powder is passing therethrough; means for compacting said powder while in said temporary holder; and means for exhausting the air from said powder while in said temporary receiving means, substantially as described.

37. In a filling machine, the combination of means for weighing a predetermined quantity of powder; means for temporarily holding said powder after it is weighed; a chute for conveying said powder to said temporary holder; means to tap said chute while the powder is therein; means for compacting said powder while in said temporary holder; means to deliver said powder from said holder to a receptacle; and means for exhausting the air from said powder while in said chute, and while in said temporary receiving means, substantially as described.

38. In a filling machine, the combination of means for weighing a predetermined quantity of powder; means for temporarily holding said powder after it is weighed; a chute for conveying said powder to said temporary holder; means to tap said chute while said powder is therein; a plunger for temporarily compacting said powder while in said holder; a foraminous plate for supporting said powder while in said holder; and means for exhausting the air from said powder while in said temporary receiving means, substantially as described.

39. In a filling machine, the combination of means for weighing a predetermined amount of powder; a temporary holder for the weighed powder; a chute for conveying said powder to said holder; means to tap said chute while conveying said powder; means to compact said powder while in said holder; means to exhaust the air from said powder while in said holder; and connections governed by said weighing means adapted to control the compacting and air exhausting operations, substantially as described.

40. In a filling machine, the combination of means for weighing a predetermined amount of powder; a temporary holder for the weighed powder; a chute for conveying said powder to said holder; means to tap said chute while said powder is therein; means to compact said powder while in said holder; means to exhaust the air from said powder while in said chute and holder; a foraminous plate for supporting the powder while in said holder; means for filling said powder from said holder into a receptacle; and connections governed by said weighing means adapted to control the compacting, the filling, and the air exhausting operations, substantially as described.

41. In a filling machine, the combination of means for weighing a predetermined amount of powder; a temporary holder for the weighed powder; a chute for conveying said powder to said holder; means to tap said chute while containing said powder; means to compact said powder while in said holder; means to exhaust the air from said powder while in said holder; a valve provided with a foraminous plate for supporting said powder while in said holder; means to position and seal from the atmosphere a receptacle adapted to receive said powder; and connections governed by said weighing means adapted to control the compacting, the filling the positioning, and the air exhausting operations, substantially as described.

42. In a powder filling machine, the combination of means for segregating a predetermined quantity of powder; a rotating shaft; means associated with said segregating means for governing the rotations of said shaft; a compacting chamber adapted to receive said powder from said segregating means; a chute adapted to convey said powder from said segregating means to said chamber; means to tap said chute while conveying said powder; means in said chamber for compacting said powder; means for exhausting the air from said compacted powder; and means governed by said rotating shaft for controlling the compacting operations, substantially as described.

43. In a powder filling machine, the combination of means for segregating a predetermined quantity of powder; a rotating shaft; means associated with said segregating means for governing the rotations of said shaft; a compacting chamber adapted to receive said powder from said segregating means; a chute for conveying said powder from said segregating means to said chamber; means to tap said chute while conveying said powder; means in said chamber for compacting said powder; means for exhausting the air from said chute and compacted powder; means controlled by said shaft for governing the air exhausting operations; and means governed by said rotating shaft for controlling the compacting operations, substantially as described.

44. In a powder filling machine, the combination of means for segregating a predetermined quantity of powder; a rotating shaft; means associated with said segregating means for governing the rotations of said shaft; a compacting chamber provided with a foraminous bottom adapted to receive said powder from said segregating means; a chute for conveying said powder from said segregating means to said chamber; means for tapping said chute to dislodge any powder that may stick thereto; means in said chamber comprising a reciprocating plunger for compacting said powder; means for exhausting the air from said chute and compacted powder; means controlled by said shaft for governing the air exhausting operations; and means governed by said rotating shaft for controlling the compacting operations, substantially as described.

45. In a powder filling machine, the combination of a weighing means adapted to segregate a predetermined amount of powder; a chute adapted to receive said powder from said weighing means; means adapted to tap said chute while containing said powder; and means governed by said weighing means for controlling the operation of said tapping means, substantially as described.

46. In a powder filling machine, the combination of a compacting chamber having a movable foraminous bottom; a chute for conveying powder to said chamber; means for tapping said chute while containing said powder; means for sealing a container against the atmosphere in register with said chamber and bottom; means for compacting powder in said chamber; means for exhausting the air from said chute, powder and container; and means for moving said bottom and filling said powder into said container, substantially as described.

47. In a powder filling machine, the combination of a compacting chamber having a movable foraminous bottom; a chute for conveying powder to said chamber; means for tapping said chute while containing said powder; means for raising and lowering said chamber and sealing a container against the atmosphere in register with said chamber and bottom; means comprising a reciprocating plunger for compacting powder in said chamber; means for exhausting the air from said chute, powder and container; and means for moving said bottom and filling said powder into said container, substantially as described.

48. In a powder filling machine, the combination of a chamber provided with a movable foraminous bottom; means for compacting powder in said chamber while resting on said bottom; means to suck air from said powder through said bottom in one direction; and means to move said bottom during the sucking operation to cause the air to pass through said bottom in the opposite direction in order to clean the same, substantially as described.

49. In a powder filling machine, the combination of a chamber provided with a movable foraminous bottom; means for compacting powder in said chamber while resting on said bottom; means comprising a passage having a port to suck air from said powder through said bottom in one direction; and means to move said bottom across said port during the sucking operation to cause the air to pass through said bottom in the opposite direction in order to clean the same, substantially as described.

50. In a powder filling machine, the combination of means for segregating a predetermined weight of powdered material; means for compacting said powdered material; a chute for conveying said material from said segregating to said compacting means; means for tapping said chute while containing said material to dislodge any particles that may adhere to the walls thereof; means for exhausting the air from said chute and material; means for filling said material into a receiver the air from which has also been exhausted; and a single means governing the compacting, the air exhausting as well as the filling operations, substantially as described.

51. In a powder filling machine, the combination of means to segregate a predetermined quantity of powder; a chamber in which said powder may be compacted; a chute leading from said segregating means to said chamber; an exhaust pipe leading from said chamber; a valve in said pipe; means causing said segregating means to discharge said powder into said chute; and means operating simultaneously with said discharging means to open said valve and to cause said powder to be sucked from said chute into said chamber, substantially as described.

52. In a powder filling machine, the combination of a chamber provided with a movable foraminous bottom; a plunger for compacting powder in said chamber; means to raise and lower said chamber to seal from the outer atmosphere a can in register with said chamber and bottom; means comprising a valve, a passage and a port for exhausting air in one direction through said bottom from the compacted powder and can; and means to move said bottom across said port to permit said air to pass through said bottom in an opposite direction and also to permit said compacted powder to fill said exhausted can, substantially as described.

53. In a powder filling machine, the combination of a chamber having a movable foraminous bottom; and an air exhausting means adapted to suck air through said bottom in one direction when registering with said chamber and comprising a passage adapted to be intersected by said bottom when the latter is moved, said air exhausting means also adapted to suck air through said bottom in the opposite direction to clean the same when said bottom is out of register with said chamber, substantially as described.

54. In a powder filling machine, the combination of a powder receiving chamber; a movable valve provided with an opening and with a foraminous plate, each at different times adapted to register with said chamber; means to move said valve and plate out of, and said opening into, register with said chamber; an air exhausting means having a bent passage adapted to be intersected by said plate communicating with said chamber for sucking air through said plate in one direction when registering with said chamber, and adapted to suck air through said plate in an opposite direction and thereby clear the same when intersecting said bent passage, substantially as described.

55. In a powder filling machine, the combination of a chamber provided with a movable foraminous bottom; a plunger for compacting powder in said chamber; means to raise and lower said chamber to seal from the outer atmosphere a can in register with said chamber and bottom; means comprising a valve for exhausting air from the compacted powder through said bottom in one direction and also from said can; means to move said bottom across said air exhausting means to permit said compacted powder to fill said exhausted can and to permit said air to be sucked through said bottom in an opposite direction to clean the same; and a single means governing the compacting, the sealing, the air exhausting, as well as the bottom moving operations, substantially as described.

56. In a powder filling machine, the combination of means to segregate a predetermined amount of powder; a chamber to temporarily receive said powder; a chute to convey said powder from the segregating means to the chamber; a tapping device to agitate the chute and prevent powder from sticking to the walls thereof; a valve having an opening and a foraminous plate, each adapted to register at different times with the chamber; means for moving said valve to cause said opening and plate to alternately register for predetermined times with said chamber; a compacting means in said chamber adapted to compact the powder when said plate is in register with said chamber; a suction means provided with a passage adapted to be intersected by said plate when not in register with said chamber and provided with a controlling valve; means to open said controlling valve to apply suction to said chute while powder is entering said chamber, to apply suction to said chamber while the powder is being compacted therein, and to apply suction to clean said plate when intersecting said passage; and means governed by said segregating means for closing said suction controlling valve after a predetermined time, substantially as described.

57. In a powder filling machine, the combination of a compacting chamber; means to suck powder into said chamber; means to seal a can against the outer atmosphere in register with said chamber; means to fill said powder from said chamber into said can; and means to permit the outer air to leak into said filled can before unsealing it from said chamber, substantially as described.

58. In a powder filling machine, the combination of a compacting chamber; means to suck powder into said chamber; a reciprocating plunger for compacting powder in said chamber; means to seal a can against the outer atmosphere in register with said chamber; means to cause said plunger to force said powder from said chamber into said can; means to withdraw said plunger after the can is filled; and means to permit the outer air to leak into said filled can before unsealing it from said chamber, substantially as described.

59. In a powder filling machine, the combination of a vertically movable chamber; means for temporarily sealing a can to said chamber; a reciprocating packing plunger in said chamber for forcing powder from the latter into said can; means to exhaust air from said chamber and can, and means to first raise said chamber slightly after said can is filled to permit air to leak into said can and to then raise said chamber clear of said can, substantially as described.

60. In a powder filling machine, the combination of a vertically moving chamber; means to seal from the outer atmosphere a can to said chamber; means to exhaust air from said chamber and can; and means comprising a rotating shaft for first raising said chamber slightly to permit air to leak into said can and to then raise said chamber clear of said can, substantially as described.

61. In a powder filling machine, the combination of a power pulley; a governing shaft; clutch connections between said pulley and shaft; means to segregate a predetermined quantity of powder adapted to control said clutch connections; a compacting chamber; a movable valve closing the bottom of said chamber; means comprising a conduit and valve controlling the same for exhausting air from said chamber; means for opening and closing said conduit valve controlled by said governing shaft; and intermittently gear connections between said governing shaft and first mentioned valve, substantially as described.

In testimony whereof, I affix my signature, in presence of two witnesses.

HAYWOOD GUION DEWEY.

Witnesses:
J. H. GUWECKE,
H. S. RODGERS.